(12) United States Patent
Hasegawa et al.

(10) Patent No.: US 6,538,756 B1
(45) Date of Patent: Mar. 25, 2003

(54) INFORMATION PROCESSING APPARATUS AND RECORDING MEDIUM WITH PATTERN GENERATION PROGRAMS RECORDED THEREON

(75) Inventors: Susumu Hasegawa, Sakai (JP); Megumi Itou, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/389,171

(22) Filed: Sep. 2, 1999

(30) Foreign Application Priority Data

Sep. 3, 1998 (JP) .......................... 10-250000

(51) Int. Cl.⁷ .............................................. G06H 15/00
(52) U.S. Cl. ..................................... 358/1.11
(58) Field of Search ................. 358/1.1, 1.11, 358/1.16, 1.17, 1.18, 1.9; 345/469, 469.1, 472.3, 658, 472; 400/17; 347/37, 8

(56) References Cited

U.S. PATENT DOCUMENTS

| | | | |
|---|---|---|---|
| 4,150,902 A | 4/1979 | Brescia | 400/17 |
| 4,748,443 A | * 5/1988 | Uehara et al. | 345/469 |
| 4,897,638 A | 1/1990 | Kokunishi et al. | 340/751 |
| 5,414,448 A | 5/1995 | Wada et al. | 345/194 |
| 5,850,228 A | 12/1998 | Hasegawa et al. | |

FOREIGN PATENT DOCUMENTS

| | | |
|---|---|---|
| EP | 0 095 536 | 12/1983 |
| JP | 3-169655 | 7/1991 |
| JP | 10-055162 | 2/1998 |
| JP | 10-091139 | 4/1998 |

* cited by examiner

Primary Examiner—Arthur G. Evans
(74) Attorney, Agent, or Firm—David G. Conlin; John J. Penny; Edwards & Angell, LLP

(57) ABSTRACT

An information processing apparatus provided with an auxiliary memory device for storing type skeletal shape information indicating skeletal shapes of characters, including symbols and pictorial symbols, and element shape information indicating an outline shape and a skeletal shape of each of constituent elements constituting the characters in advance, and a pattern generator for generating a pattern by changing the element shape information according to the type skeletal shape information, drawing the constituent elements according to a predetermined design corresponding to the changed element shape information, and combining the constituent elements thus drawn. This information processing apparatus is capable of easily generating high-quality patterns, which are colored in various ways according to typeface, by reducing the number of data producing steps and data volume necessary for generating patterns by putting a plurality of colors into each stroke of characters including symbols and pictorial symbols.

19 Claims, 27 Drawing Sheets

| TOTAL NUMBER OF OUTLINE POINTS : 421 |
|---|
| OUTLINE POINT COORDINATES DATA OF FIRST OUTLINE INFORMATION OF (FIRST) ELEMENT : 422 |
| ⋮ |
| OUTLINE POINT COORDINATES DATA OF Nth OUTLINE INFORMATION OF (FIRST) ELEMENT |
|  |
| OUTLINE POINT COORDINATES DATA OF FIRST OUTLINE INFORMATION OF (Mth) ELEMENT |
| ⋮ |
| OUTLINE POINT COORDINATES DATA OF N'th OUTLINE INFORMATION OF (Mth) ELEMENT |

\* NUMBER OF ELEMENTS: M
NUMBER OF PIECES OF OUTLINE INFORMATION OF (FIRST) ELEMENT: N
NUMBER OF PIECES OF OUTLINE INFORMATION OF (Mth) ELEMENT: N'

| TOTAL NUMBER OF SKELETAL POINTS : 424 | |
|---|---|
| FIRST SKELETAL POINT COORDINATES DATA OF (FIRST) ELEMENT | SKELETAL POINT COLOR CODE : 427 |
| ⋮ | ⋮ |
| QtH SKELETAL POINT COORDINATES DATA OF (FIRST) ELEMENT | SKELETAL POINT COLOR CODE |
| | |
| FIRST SKELETAL POINT COORDINATES DATA OF (Mth) ELEMENT | SKELETAL POINT COLOR CODE |
| ⋮ | ⋮ |
| Q'th SKELETAL POINT COORDINATES DATA OF (Mth) ELEMENT | SKELETAL POINT COLOR CODE |

425

* NUMBER OF ELEMENTS: M
NUMBER OF SKELETAL POINTS OF (FIRST) ELEMENT: Q
NUMBER OF SKELETAL POINTS OF (Mth) ELEMENT: Q'

FIG. 8

|  | ⌐413 |
|---|---|
| OUTLINE THICKNESS : 417 | OUTLINE COLOR CODE : 418 |
| DRAWING DIRECTION : 419 ||
| (FIRST) INSIDE COLOR CODE : 420 ||
| ⋮ ||
| (Oth) INSIDE COLOR CODE ||

NUMBER OF INSIDE COLOR CODES POSSESSED
BY FIRST OUTLINE OF (FIRST) ELEMENT: O

| ELEMENT SHAPE CHANGING INFORMATION OF FIRST OUTLINE POINT OF FIRST OUTLINE OF (FIRST) ELEMENT : 423 |
|---|
| ⋮ |
| ELEMENT SHAPE CHANGING INFORMATION OF Pth OUTLINE POINT OF FIRST OUTLINE OF (FIRST) ELEMENT |

NUMBER OF OUTLINE POINTS OF FIRST
OUTLINE OF (FIRST) ELEMENT: P

FIG. 25

| TYPEFACE CODE : 404<br>NUMBER OF ELEMENTS : 405 ||
|---|---|
| ELEMENT<br>CODE : 407 | NUMBER OF PIECES<br>OF OUTLINE INFORMATION : 408 |
| NUMBER OF<br>OUTLINE POINTS : 411 | POINTER TO OUTLINE POINT<br>COORDINATES DATA : 412 |
| POINTER TO COLOR SPECIFYING INFORMATION : 413' ||
| POINTER TO OUTLINE DRAWING ORDER DATA : 414' ||
| ⋮ ||
| NUMBER OF<br>OUTLINE POINTS | POINTER TO OUTLINE POINT<br>COORDINATES DATA |
| POINTER TO COLOR SPECIFYING INFORMATION ||
| POINTER TO OUTLINE DRAWING ORDER DATA ||
| NUMBER OF<br>SKELETAL POINTS : 415 | POINTER TO SKELETAL POINT<br>COORDINATES DATA : 416 |
| ⋮ ||
| ELEMENT<br>CODE : 407 | NUMBER OF PIECES<br>OF OUTLINE INFORMATION : 408 |
| NUMBER OF<br>OUTLINE POINTS | POINTER TO OUTLINE POINT<br>COORDINATES DATA |
| POINTER TO COLOR SPECIFYING INFORMATION ||
| POINTER TO OUTLINE DRAWING ORDER DATA ||
| ⋮ ||
| NUMBER OF<br>OUTLINE POINTS | POINTER TO OUTLINE POINT<br>COORDINATES DATA |
| POINTER TO COLOR SPECIFYING INFORMATION ||
| POINTER TO OUTLINE DRAWING ORDER DATA ||
| NUMBER OF<br>SKELETAL POINTS | POINTER TO SKELETAL POINT<br>COORDINATES DATA |

| TOTAL NUMBER OF OUTLINE POINTS : 421 |
|---|
| OUTLINE POINT COORDINATES DATA OF FIRST OUTLINE INFORMATION OF (FIRST) ELEMENT : 422 |
| ⋮ |
| OUTLINE POINT COORDINATES DATA OF Nth OUTLINE INFORMATION OF (FIRST) ELEMENT |
| |
| OUTLINE POINT COORDINATES DATA OF FIRST OUTLINE INFORMATION OF (Mth) ELEMENT |
| ⋮ |
| OUTLINE POINT COORDINATES DATA OF N'th OUTLINE INFORMATION OF (Mth) ELEMENT |

\* NUMBER OF ELEMENTS: M
NUMBER OF PIECES OF OUTLINE INFORMATION OF (FIRST) ELEMENT: N
NUMBER OF PIECES OF OUTLINE INFORMATION OF (Mth) ELEMENT: N'

| TOTAL NUMBER OF SKELETAL POINTS : 424 | |
|---|---|
| FIRST SKELETAL POINT COORDINATES DATA OF (FIRST) ELEMENT | POINTER TO SKELETAL POINT COLOR CODE : 427' |
| ⋮ | ⋮ |
| QtH SKELETAL POINT COORDINATES DATA OF (FIRST) ELEMENT | POINTER TO SKELETAL POINT COLOR CODE |

} 425

| | |
|---|---|
| FIRST SKELETAL POINT COORDINATES DATA OF (Mth) ELEMENT | POINTER TO SKELETAL POINT COLOR CODE |
| ⋮ | ⋮ |
| Q'th SKELETAL POINT COORDINATES DATA OF (Mth) ELEMENT | POINTER TO SKELETAL POINT COLOR CODE |

} 425

\* NUMBER OF ELEMENTS: M
NUMBER OF SKELETAL POINTS OF (FIRST) ELEMENT: Q
NUMBER OF SKELETAL POINTS OF (Mth) ELEMENT: Q'

| CHARACTER CODE NUMBER OF CONSTITUENT ELEMENTS | |
|---|---|
| ELEMENT CODE | DRAWING ORDER |
| ⋮ | ⋮ |
| ELEMENT CODE | DRAWING ORDER |

| TYPEFACE CODE NUMBER OF ELEMENTS | |
|---|---|
| ELEMENT CODE | COLOR SPECIFYING INFORMATION |
| | OUTLINE DRAWING INFORMATION |
| | SKELETAL POINT COLOR CODE |
| | ⋮ |
| ELEMENT CODE | COLOR SPECIFYING INFORMATION |
| | OUTLINE DRAWING INFORMATION |
| | SKELETAL POINT COLOR CODE |

INFORMATION PROCESSING APPARATUS AND RECORDING MEDIUM WITH PATTERN GENERATION PROGRAMS RECORDED THEREON

FIELD OF THE INVENTION

The present invention relates to information processing apparatuses such as word processors and computers, and more particularly to an information processing apparatus incorporating a pattern generator for generating patterns of characters, including symbols and pictorial symbols, and a recording medium on which pattern generation programs for use in the pattern generator are recorded.

BACKGROUND OF THE INVENTION

Conventionally, for an information processing apparatus such as a word processor, some pattern generating methods for generating patterns of characters including symbols and pictorial symbols have been proposed. For example, Japanese laid-open patent application No. (Tokukaihei) 3-169655 (published on Jul. 23, 1991) discloses a "color image output and display method" of generating a colored character by dividing a single character pattern into a plurality of strokes, defining outline approximation information for each stroke, assigning a stroke number and a color code corresponding to the stroke number to each stroke, restoring the outline of each stroke from the outline approximation information in a color image memory during output and display, and putting color of a specified color code into the inside of each outline.

However, with the method of Japanese laid-open patent application No. (Tokukaihei) 3-169655, when generating colored characters of various different typefaces, it is necessary to set a stroke number and assign a color code for every character of each typeface. Moreover, the color code which is once assigned for generating a character of a typeface can not be used for generating the character of a different typeface. Therefore, when generating Chinese kanji characters, this method suffers from a problem that it is necessary to store color codes for the strokes of more than about 7000 characters for each typeface and the volume of information becomes extremely large.

Moreover, with this method of assigning a color code to each stroke number, it is impossible to put color into the inside of a stroke geometrically and in a complex manner.

SUMMARY OF THE INVENTION

In view of the above-mentioned problems, it is an object of the present invention to provide an information processing apparatus capable of easily producing high-quality patterns, which are colored in various ways according to typeface, by reducing the number of steps of producing data and the data volume necessary for generating patterns by putting a plurality of colors into each stroke of characters including symbols and pictorial symbols.

In order to achieve the above object, an information processing apparatus of the present invention is an information processing apparatus for generating patterns of characters including symbols and pictorial symbols, and generates a pattern of a character by drawing constituent elements constituting the character according to type skeletal shape information indicating a skeletal shape of the character and element shape information indicating an outline shape and a skeletal shape of each of the constituent elements, and by combining the constituent elements drawn.

With this structure, since a pattern is generated by drawing constituent elements of a character according to the type skeletal shape information indicating a skeletal shape of the character and element shape information indicating an outline shape and a skeletal shape of each of the constituent elements of the character and by combining the constituent elements drawn, an outline of a desired pattern can be generated by deforming the element shape according to the type skeletal shape, in accordance with the type skeletal shape information indicating the skeletal shape of the character and the element shape information including the outline shapes and skeletal shapes of minimum elements constituting the character, which are sorted according to typeface.

More specifically, compared with a conventional font development which requires designing of patterns of characters (including symbols and pictorial symbols) for each of different typefaces, the above-mentioned structure can develop a typeface with a smaller number of steps and decrease the data volume, because this structure can generate a pattern by simply designing the element shape information which is sorted according to typeface.

In order to achieve the above-mentioned object, an information processing apparatus of the present invention is an information processing apparatus for generating patterns of characters including symbols and pictorial symbols, and includes: an information memory section for storing, in advance, type skeletal shape information indicating a skeletal shape of each character and element shape information indicating an outline shape and a skeletal shape of each of constituent elements constituting the character; an element shape information changing section for changing the element shape information according to the type skeletal shape information; and a pattern generating section for generating a pattern of the character by drawing the constituent elements according to the changed element shape information and combining the constituent elements drawn.

With this structure, a character of a desired pattern is displayed according to the type skeletal shape information and element shape information stored in the information memory section in advance. It is thus possible to generate the outline of a desired pattern by holding the type skeletal shape information indicating the skeletal shape of the character and the element shape information including the outline shapes and skeletal shapes of minimum elements constituting the character, which are sorted according to typeface, and by deforming the element shape according to the type skeletal shape.

In other words, compared with the conventional font development which requires designing of all of patterns of characters (including symbols and pictorial symbols) for each of different typefaces, the above-mentioned structure can develop a typeface with a smaller number of steps and decrease the data volume, because this structure can generate patterns by simply designing the element shape information which is sorted according to typeface.

Here, the pattern generation in the above-mentioned information processing apparatus is carried out with the use of a recording medium having, for example, the following pattern generation programs recorded thereon.

In order to achieve the above-mentioned object, the recording medium with the pattern generation programs recorded thereon of the present invention is used in an information processing apparatus for generating patterns of characters including symbols and pictorial symbols, and includes the process of generating a pattern by drawing constituting elements constituting a character according to type skeletal shape information indicating a skeletal shape of the character and element shape information indicating an outline shape and a skeletal shape of each of the constituting elements and by combining the constituting elements drawn.

In order to achieve the above-mentioned object, it is preferred that the information memory section in the information processing apparatus further stores, as the type skeletal shape information, at least element paste information which specifies the element shape information corresponding to the constituent elements and element drawing order information which specifies order of precedence of drawing performed by the pattern generating section.

With this structure, in addition to the function of the information processing apparatus including the information memory section, since the element paste information which specifies the element shape information corresponding to the constituent elements and the element drawing order information which specifies order of precedence of drawing are stored as the type skeletal shape information in the information memory section, it is possible to easily control over-painting of the constituent elements and generate a high-quality pattern without a limitation to the design of the pattern.

In order to achieve the above-mentioned object, it is preferred that the information memory section in the information processing apparatus further stores, as the element shape information, at least a single piece or plural pieces of outline information, color specifying information corresponding to each piece of the outline information, outline drawing order information which specifies order of precedence of outline drawing performed by the pattern generating section, and skeletal point information indicating a skeletal shape peculiar to each constituent element.

With this structure, in addition to the function of the information processing apparatus including the information memory section, since at least a single piece or plural pieces of outline information, the color specifying information corresponding to each piece of the outline information, the outline drawing order information which specifies order of precedence of outline drawing performed by the pattern generating section, and the skeletal point information indicating a skeletal shape peculiar to each constituent element are stored as the element shape information in the information memory section, it is possible to express a complicated outline shape and coloration, and easily control the over-painting of the outlines. Consequently, a high-quality pattern can be generated without a limitation to the design of pattern.

In order to achieve the above-mentioned object, it is preferred that the color specifying information stored in the information memory section in the information processing apparatus further includes outline color information which specifies a color code and thickness of an outline of each constituent element, and inside color information composed of a direction of drawing the inside of the outline of the constituent element and a single color code or a plurality of color codes.

With this structure, in addition to the function of the information processing apparatus including the information memory section storing the color specifying information, since the color specifying information includes the outline color information which specifies a color code and thickness of an outline of each constituent element, and the inside color information composed of a direction of drawing the inside of the constituent element and a single color code or a plurality of color codes, it is possible to draw a patten in which a single outline is colored to have a pattern of, for example, geometrical gradations. Thus, a pattern with high-quality color representation can be generated.

In order to achieve the above-mentioned object, in the information processing apparatus in which the skeletal point information is stored in the information memory section, it is preferred that the element shape information further includes coordinates values representing each of skeletal points for expressing the skeletal shape, and a skeletal point color code indicating color information peculiar to each skeletal point.

With this structure, in addition to the function of the information processing apparatus including the information memory section storing the skeletal point information, since the element shape information includes the coordinates values representing each of skeletal points for expressing the skeletal shape and the skeletal point color code indicating color information peculiar to each skeletal point, it is possible to draw a patten in which the inside of an outline of the element is colored to have a pattern of, for example, geometrical gradations.

Moreover, since the skeletal point color code has a value independent of the color specifying information in the outline information and a plurality of painting ways can be stored for a single piece of element information of a single typeface, it is possible to generate patterns colored in various ways without increasing the data volume.

Furthermore, since it is possible to perform over-painting of the respective element information and over-painting of a plurality of outlines corresponding to a single piece of element information, a high-quality pattern can be generated without a limitation to the design of the pattern.

Besides, since it is possible to perform both drawing according to the color specifying information possessed by the outline information and drawing according to the skeletal point color code possessed by the skeletal point, patterns colored in various ways can be generated without increasing the data volume.

In order to achieve the above-mentioned object, an information processing apparatus of the present invention generates patterns of characters by drawing constituent elements constituting the characters according to type skeletal shape information indicating skeletal shapes of the characters including symbols and pictorial symbols, element shape information indicating an outline shape and a skeletal shape of each of the constituent elements, and drawing information for determining a design, including color and pattern, of each constituent element, and by combining the constituent elements drawn.

With this structure, since a pattern is generated by combining the constituting elements drawn according to the type skeletal shape information indicating the skeletal shape of a character, the element shape information indicating the outline shape and the skeletal shape of each of the constituent elements constituting the character and the drawing information for determining a design, including color and pattern, of each constituent element, it is possible to generate an outline of a desired pattern by deforming the element shape according to the type skeletal shape, in accordance with the type skeletal shape information indicating the skeletal shape of the character and the element shape information including the outline shapes and skeletal shapes of minimum elements constituting the character, which are sorted according to typeface.

Namely, compared with the conventional font development which requires designing of patterns of all of characters (including symbols and pictorial symbols) for each of different typefaces, the above-mentioned structure can develop a typeface with a smaller number of steps and decrease the data volume, because this structure can generate a pattern by simply designing the element shape information which is sorted according to typeface.

Moreover, with the above-mentioned structure, a pattern is generated according to the drawing information for coloring and patterning the constituent elements as well as the type skeletal shape information and element shape information. Thus, the above-mentioned structure can develop a typeface with a reduced number of steps and decrease the data volume compared with the conventional font development which requires addition of color information with respect to every stroke, because this structure can generate a pattern by simply designing the element shape information sorted according to typeface and setting the color information.

Additionally, since the drawing information for drawing the constituent elements is stored independently of other information, it is possible to change only the drawing information. With this structure, since the user can change the design of a typeface and pattern such as coloring desired by the user individually, the drawing information can be set by each user. Furthermore, when a new typeface is developed, this structure can manage the new typeface quickly.

In order to achieve the above-mentioned object, an information processing apparatus of the present invention includes: an information memory section for storing, in advance, type skeletal shape information indicating skeletal shapes of characters including symbols and pictorial symbols, element shape information indicating an outline shape and a skeletal shape of each of constituent elements constituting each character, and drawing information for determining a design, including color and pattern, of each constituent element; an element shape information changing section for changing the element shape information according to the type skeletal shape information; and a pattern generating section for generating a pattern of the character by drawing the constituent elements according to the changed element shape information and the drawing information and by combining the constituent elements drawn.

With this structure, a character of a desired pattern is displayed according to the type skeletal shape information, element shape information and drawing information stored in the information memory section in advance. It is thus possible to hold the type skeletal shape information indicating the skeletal shape of each character, the element shape information indicating the outline shape and skeletal shape of each of minimum elements constituting the character, which are sorted according to typeface, and the drawing information for determining the design, including color and pattern, of each constituent element, and to generate an outline of a desired pattern by deforming the element shape according to the type skeletal shape.

In other words, compared with the conventional font development which requires designing of the patterns of all of characters (including symbols and pictorial symbols) for each of different typefaces and addition of color information with respect to every stroke, the above-mentioned structure can develop a typeface with a reduced number of steps and decrease the data volume, because this structure can generate a pattern by simply designing the element shape information which is sorted according to typeface and setting the color information.

Here, the pattern generation in the above-mentioned information processing apparatus is carried out with the use of a recording medium having, for example, the following pattern generation programs recorded thereon.

In order to achieve the above-mentioned object, the recording medium with the pattern generation programs recorded thereon of the present invention is used in an information processing apparatus for generating patterns of characters including symbols and pictorial symbols, and includes the process of generating a pattern by drawing constituting elements constituting a character according to type skeletal shape information indicating a skeletal shape of the character, element shape information indicating an outline shape and a skeletal shape of each of the constituting elements and drawing information for determining the design, including color and pattern, of each constituent element, and by combining the constituting elements drawn.

It is preferred that the drawing information stored in the information memory section in the information processing apparatus further includes drawing order information indicating a drawing order of each constituent element, color specifying information specifying a color of each constituent element, outline drawing order information indicating a drawing order of an outline of each constituent element, and skeletal point color information specifying a color of a skeletal point of each constituent element.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory view showing an example of information contained as another part of the element shape information stored in the auxiliary memory device incorporated into the information processing apparatus of FIG. 2.

FIG. 7 is an explanatory view showing an example of information contained as still another part of the element shape information stored in the auxiliary memory device incorporated into the information processing apparatus of FIG. 2.

FIG. 8 is an explanatory view showing an example of information contained in color specifying information of the element shape information stored in the auxiliary memory device incorporated into the information processing apparatus of FIG. 2.

FIG. 9 is an explanatory view showing an example of information contained in outline point coordinates data of the element shape information stored in the auxiliary memory device incorporated into the information processing apparatus of FIG. 2.

FIG. 25 is an explanatory view showing an example of information contained as part of element shape information stored in the auxiliary memory device incorporated into the information processing apparatus of FIG. 23.

FIG. 26 is an explanatory view showing an example of information contained as another part of the element shape information stored in the auxiliary memory device incorporated into the information processing apparatus of FIG. 23.

FIG. 27 is an explanatory view showing an example of information contained as still another part of the element shape information stored in the auxiliary memory device incorporated into the information processing apparatus of FIG. 23.

FIG. 28 is an explanatory view showing an example of information contained as part of color specifying information of the element shape information stored in the auxiliary memory device incorporated into the information processing apparatus of FIG. 23.

FIG. 29 is an explanatory view showing an example of information contained as another part of the color specifying information of the element shape information stored in the auxiliary memory device incorporated into the information processing apparatus of FIG. 23.

DESCRIPTION OF PREFERRED EMBODIMENTS

[Embodiment 1]

Referring to FIGS. 1 to 22, the following description will explain one embodiment of the present invention. This embodiment explains a pattern generator for generating patterns of characters including symbols and pictorial symbols, installed in an information processing apparatus, such as a word processor or personal computer, having the function of inputting and outputting characters.

Figure 2:
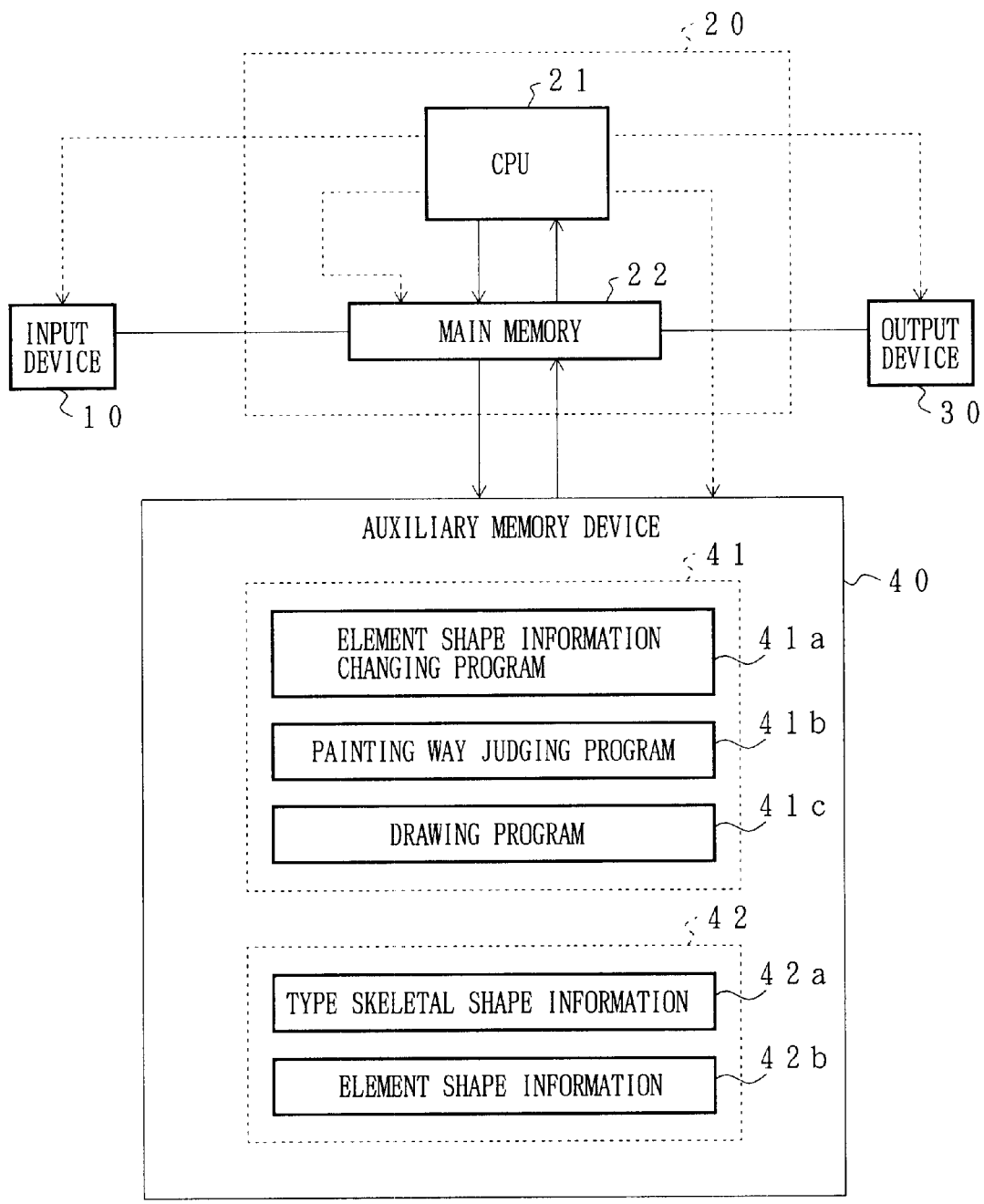
FIG. 2 is a schematic block diagram showing an example of an information processing apparatus of the present invention.

As illustrated in FIG. 2, the information processing apparatus according to this embodiment includes an input device 10, a pattern generator 20, an output device 30, and an auxiliary memory device 40.

Here, the input device 10 inputs character information such as codes of characters including symbols and pictorial symbols. The pattern generator 20 generates a pattern of a character. The output device 30 outputs a generated pattern. The auxiliary memory device 40 stores various processing-use programs 41 and various processing-use data 42 used in generating a pattern.

The character information input through the input device 10 is information related to a character subjected to the generation process of the pattern generator 20. More specifically, the character information is a character code indicating a character, a typeface code indicating the typeface of the character, and a paint judging code for judging a way of painting the pattern of the character to be output.

Therefore, for the input device 10, it is possible to use any device if it can input the above-mentioned character information. Suitable examples of the input device 10 includes a keyboard, a mouse, and a pen input device. For instance, when inputting the above-mentioned character information using the keyboard of a word processor which is set to a specific typeface, if an operator types a desired character with the keyboard, the character code and typeface code of the character are concurrently input. Then, a paint judging code for judging a way of painting the input character is selected from, for example, the menu of the word processor, and input through the keyboard.

The character information input from the input device 10 as mentioned above is stored temporarily in a later-described main memory 22 of the pattern generator 20.

The pattern generator 20 is formed by a CPU (central processing unit, information processing means) 21 as control means, and the main memory 22 for storing data temporarily.

The CPU 21 outputs control signals (shown by the dotted line in FIG. 2) to the input device 10, output device 30, auxiliary memory device 40 and main memory 22, and sends and receives data (shown by the solid lines in FIG. 2) to/from the main memory 22. Meanwhile, the main memory 22 temporarily stores data from the input device 10, data to be output to the output device 30, and data necessary for the processing in the CPU 21, such as processing-use programs stored in the auxiliary memory device 40.

Thus, since the CPU 21 controls and monitors the entire apparatus and executes processing according to the patterngeneration-use programs 41 stored in the auxiliary memory device 40, it is provided with a work memory (hereinafter referred to as the "work area").

Hence, in the pattern generator 20, various data stored in the main memory 22 are read out in the work area of the CPU 21 to execute the pattern generation of a character. The pattern of a character generated by the pattern generator 20 is temporarily stored in the main memory 22, and then output to the output device 30. The output timing is controlled by the CPU 21.

The output device 30 is a device for outputting a result of processing performed by the pattern generator 20. For instance, a printer or a display device is used as the output device 30.

An example of the output device 30 is display means capable of providing a color display by converting data composed of color codes generated by a later-described drawing program 41c as a pattern-generation-use program stored in the auxiliary memory device 40 into signals of three kinds, for example, red, green and blue.

Another example of the output device 30 is printing means capable of performing color printing by converting data composed of color codes generated by the drawing program 41c into signals of four kinds, for example, yellow, cyan, magenta and black.

As described above, the auxiliary memory device 40 stores the processing-use programs 41 which are necessary for pattern generation and used in the pattern generator 20, and processing-use data 42 which is necessary for the pattern generation. For the auxiliary memory device 40, it is possible to use an external memory device, such as a hard disk device, a CD-ROM (compact disk-read only memory) device and a MO (magneto-optical) disk device, other than the main memory 22.

Therefore, as a recording medium for use in the auxiliary memory device 40, it is possible to use a hard disk, CD-ROM, MO, etc., which are attachable to and detachable from the auxiliary memory device 40.

First, as the processing-use data 42, there are type skeletal shape information 42a indicating the shape of a character and element shape information 42b indicating the skeletal shape and outline shape of a constituent element constituting the character. The information is read out in the work area of the CPU 21 as the need arises.

Here, as the method for storing the outline shape of a character, there are (1) a method of storing an outline of a character represented by straight-line fitting, (2) a method of storing an outline of a character represented by straight lines and arcs, and (3) a method of storing an outline of a character represented by straight lines and curved lines. Considering the character quality and the efficiency of data volume, the method of (3) is most suitable for the generation of a character pattern. By taking this point into account, in this embodiment, the outline of a character is stored according to the method of (3), and data of the outline of the character stored as the straight line and curved line is contained in the element shape information 42b as outline coordinates data of the element shape information 42b.

As the above-mentioned processing-use programs 41, there are an element shape information changing program 41a, a painting way judging program 41b, and a drawing program 41c.

Here, the element shape information changing program 41a changes the skeletal point coordinates and outline point coordinates of the element shape information 42b in accordance with the shape of a character indicated by the type skeletal shape information 42a. The painting way judging program 41b recognizes a paint judging code input through the input device 10 and judges whether drawing is performed according to color specifying information or a skeletal point color code. The drawing program 41c draws an outline and the inside of the outline possessed by the element shape information 42b, according to the color specifying information or the skeletal point color code. These programs are readout in the work area of the CPU 21 of the pattern generator 20 and executed as the need arises.

Figure 1:
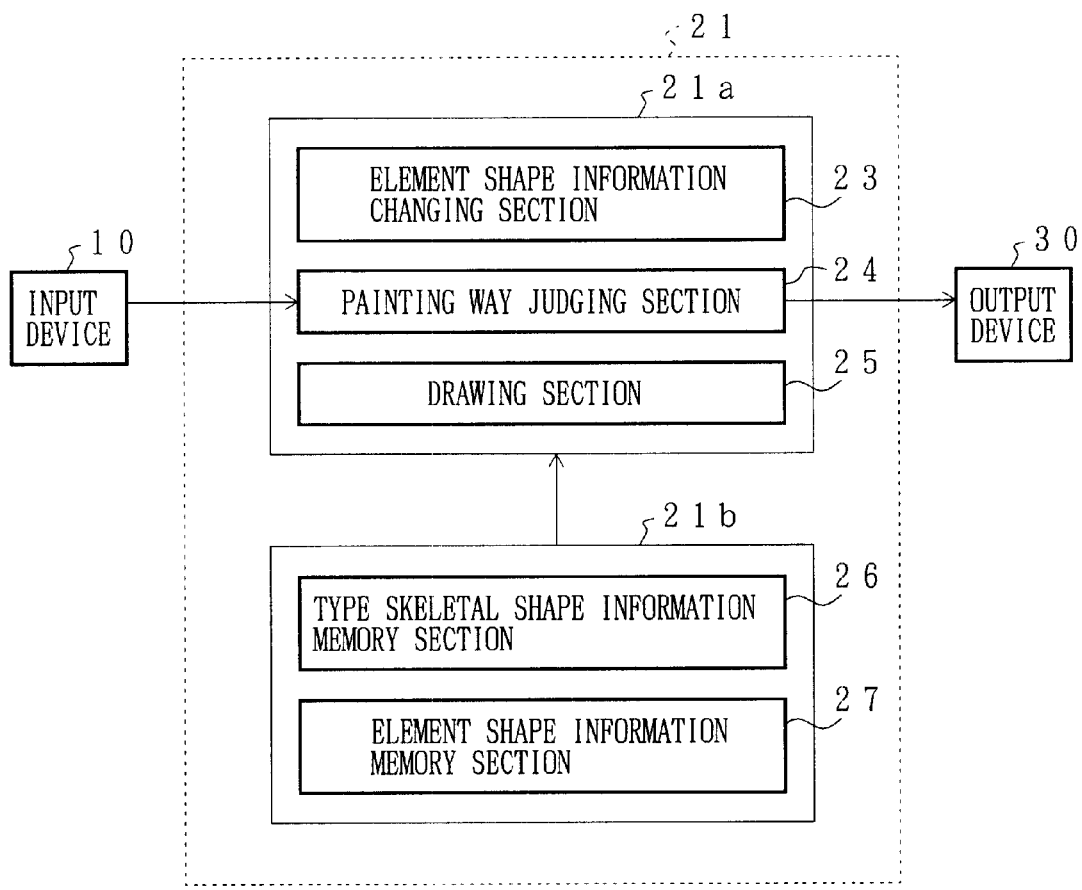
FIG. 1 is an explanatory view showing an example of executing a processing program by a CPU in a pattern generator of an information processing apparatus of the present invention.

As shown in FIG. 1, the work area of the CPU 21 includes a program executing section 21a for executing a program, and a data storage section 21b for storing character information used in the program executing section 21a.

As illustrated in FIG. 1, the program executing section 21a executes each program stored in the auxiliary memory device 40 shown in FIG. 2. The program executing section 21a includes an element shape information changing section (element shape information changing means) 23, a painting way judging section 24, and a drawing section 25.

Here, the element shape information changing section 23 executes the element shape information program 41a. The painting way judging section 24 executes the painting way judging program 41b. The drawing section 25 executes the drawing program 41c. Incidentally, the painting way judging section 24 and the drawing section 25 form pattern generating means.

As illustrated in FIG. 1, the data storage section 21b is formed by a type skeletal shape information memory section 26 and an element shape information memory section 27 as information storing means for storing information from the type skeletal shape information 42a and the element shape information 42b stored in the auxiliary memory device 40 shown in FIG. 2, respectively. The information stored in the data storage section 21b is readout to the program executing section 21a as the need arises.

Here, the following description will explain in great detail the type skeletal shape information 42a and element shape information 42b as the processing-use data stored in the auxiliary memory device 40.

Figure 3:
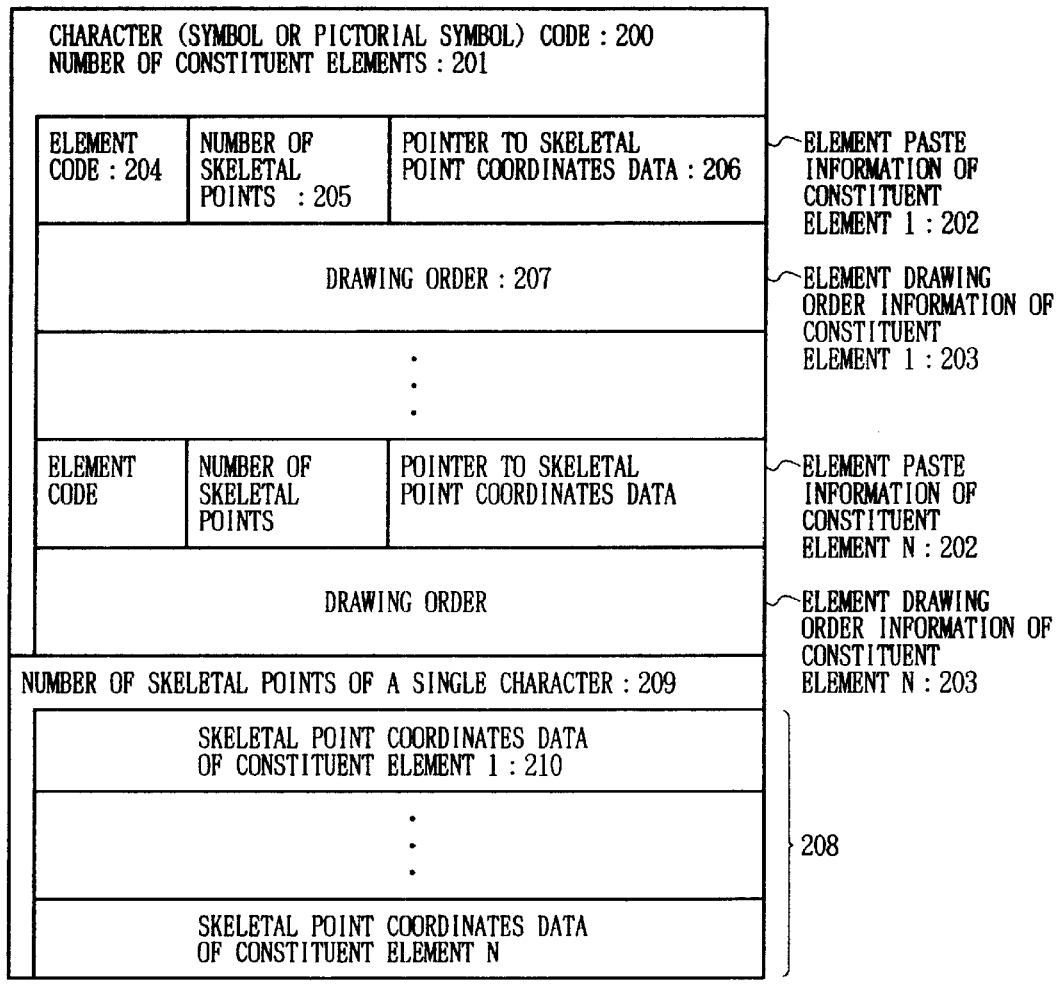
FIG. 3 is an explanatory view showing an example of information contained in type skeletal shape information stored in an auxiliary memory device incorporated into the information processing apparatus of FIG. 2.

First, as the type skeletal shape information 42a, as shown in FIG. 3, a character code 200, the number of constituent elements 201, element paste information 202, and element drawing order information 203 are stored.

The character code 200 indicates a code for distinguishing kinds of character, symbol and pictorial symbol. The number of constituent elements 201 shows the number of constituent elements constituting a single character.

The same number of the element paste information 202 as the number (N) of the constituent elements is stored to correspond to the constituent elements, respectively. The element paste information 202 is composed of an element code 204 specifying the element shape information corresponding to a constituent element, the number of skeletal points 205 indicating the number of skeletal points constituting a constituent element, and a pointer 206 to skeletal point coordinates data.

Besides, the element drawing order information 203 includes a drawing order 207 indicating the precedence in drawing.

Skeletal point coordinates data 208 is successively stored after a group of element paste information and a group of element drawing order information. The skeletal point coordinates data 208 is stored in such a form that skeletal point coordinates data 210 of the respective constituent elements are stored after the number of skeletal points 209 of a single character. The same number of skeletal point coordinates data 210 as the number (N pieces) of the constituent elements is also stored.

Figure 4:
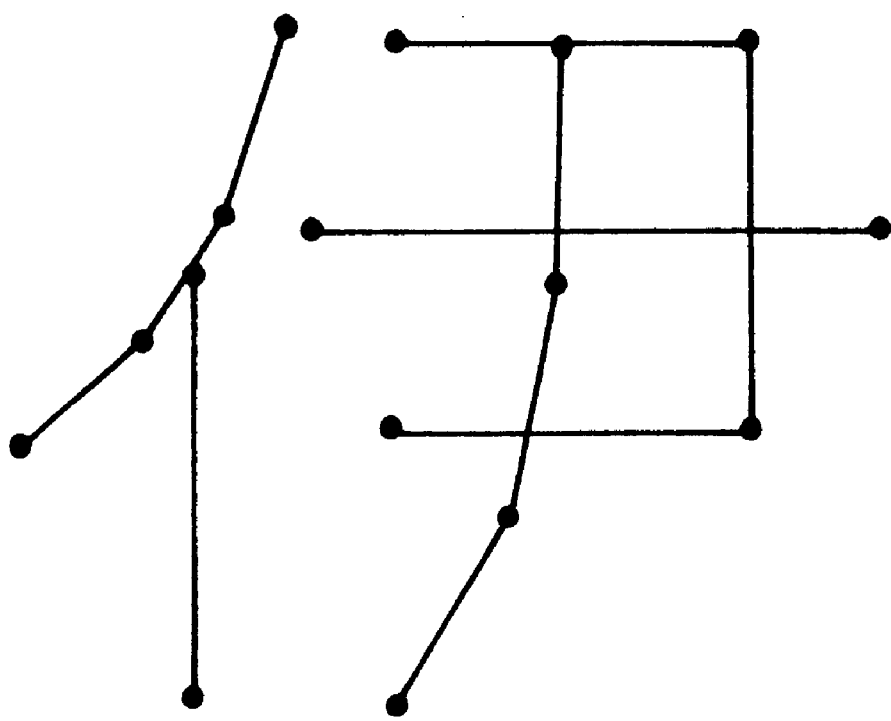
FIG. 4 is an explanatory view showing an example of geometrical information of the type skeletal shape information.

FIG. 4 shows an example of the geometrical information of the type skeletal shape information 42a of a single character input through the input device 10. In this example, a Chinese kanji character corresponding to character code No. 1643 (according to the Japanese Industrial Standards character code) is specified. Thus, the number of constituent elements of the character shown in FIG. 4. is N=7.

Next, referring to FIGS. 5 to 9, the following description will explain the element shape information 42b.

Figure 5:
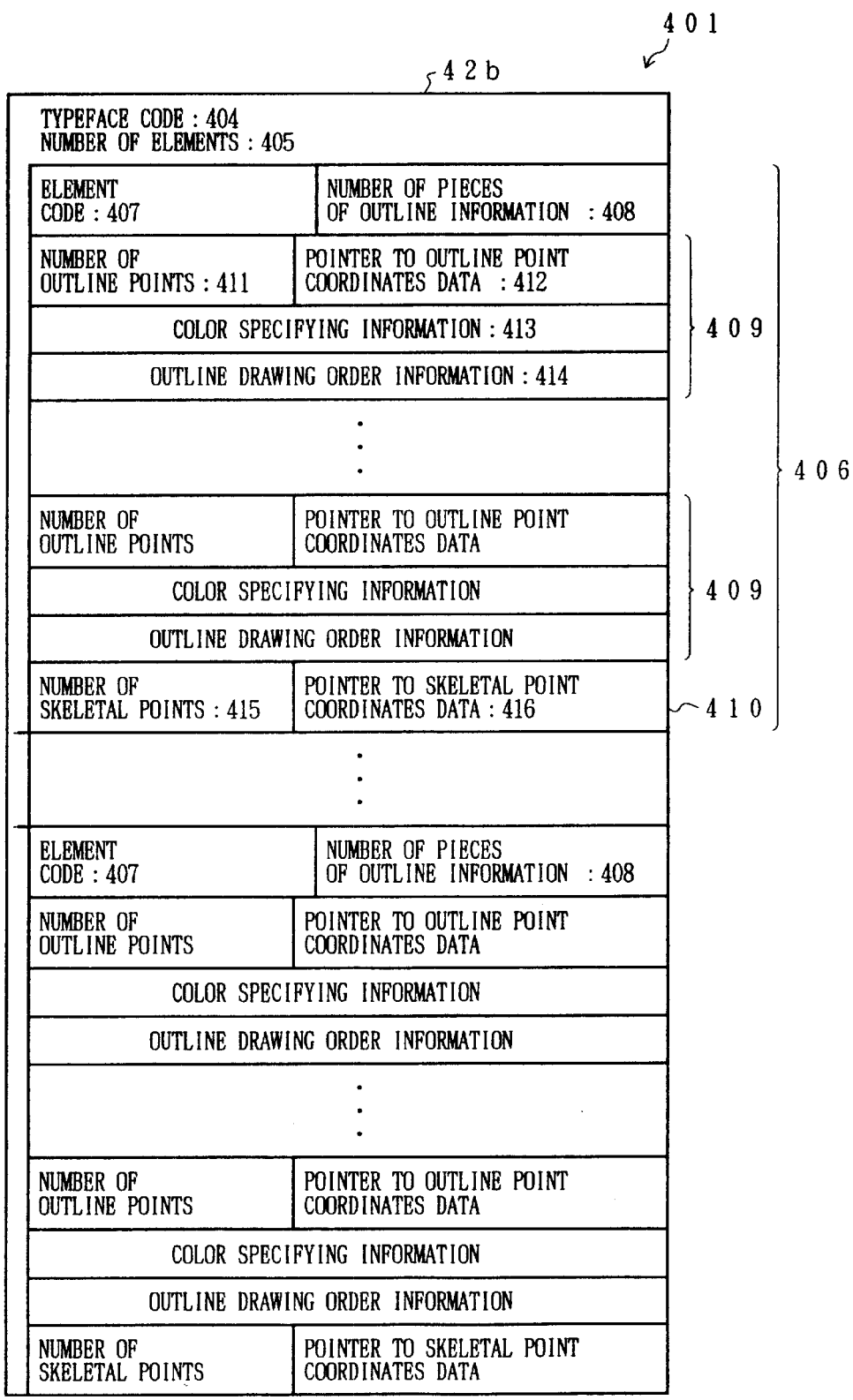
FIG. 5 is an explanatory view showing an example of information contained as part of element shape information stored in the auxiliary memory device incorporated into the information processing apparatus of FIG. 2.

As illustrated in FIGS. 5 to 7, the element shape information 42b includes an element information group 401 indicating the kind of constituent element, an outline point information group 402 defining an outline shape of each constituent element, and a skeletal point information group 403 defining a skeletal shape.

In the element information group 401, a typeface code 404 indicating a code that distinguishes the kind of a typeface, and the number of elements 405 that indicates the number of elements prepared for the typeface are stored. Besides, element information 406 of, for example, elements 1 to M if the number of elements is M, is stored after the typeface code 404 and the number of elements 405.

Each element information 406 is composed of an element code 407, the number of outline information 408 indicating the number of pieces of outline information possessed by single element information, a single piece or plural pieces of outline information 409, and a single piece of skeletal information 410.

As a single piece of outline information 409, the number of outline points 411, a pointer 412 to an outline point coordinates data, color specifying information 413, and outline drawing order information 414 are stored. Here, as illustrated in FIG. 8, the color specifying information 413 is composed of an outline thickness 417, an outline color code 418, a drawing direction 419, and an inside color code 420.

Moreover, as shown in FIG. 5, as the skeletal information 410, the number of skeletal points 415 and a pointer 416 to skeletal point coordinates data are stored.

As illustrated in FIG. 6, the outline point information group 402, which is stored after the element information group 401, includes the total number of outline points 421 and outline point coordinates data 422. As shown in FIG. 9, the outline point coordinates data 422 is composed of plural pieces of element shape changing information 423.

Moreover, as illustrated in FIG. 7, the skeletal point information group 403, which is stored after the outline point information group 402, includes the total number of skeletal points 424, and plural pieces of skeletal point information 425. The skeletal point information 425 is composed of skeletal point coordinates data 426 and skeletal point color code 427.

Figure 10:
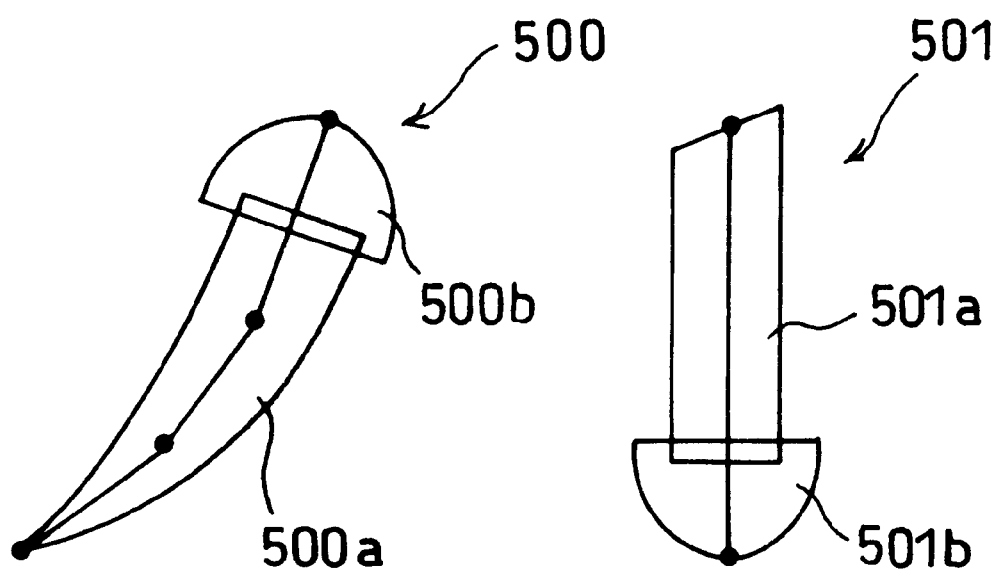
FIG. 10 is an explanatory view showing an example of geometrical information of the element shape information.

FIG. 10 shows an example of geometrical information of a single element of the element shape information 42b. In this example, two pieces of outline information are included for a single element. More specifically, two pieces of outline information 500a and 500b are included for an element 500, and two pieces of outline information 501a and 501b are included for an element 501.

As described above, in each outline point coordinates data 422 shown in FIG. 6, the element shape changing information 423 (FIG. 9) is included. The element shape changing information 423 shows a correspondence between outline points and skeletal points for an element with an element code, and is stored as a skeletal point number to which the outline points belong.

Figure 11:
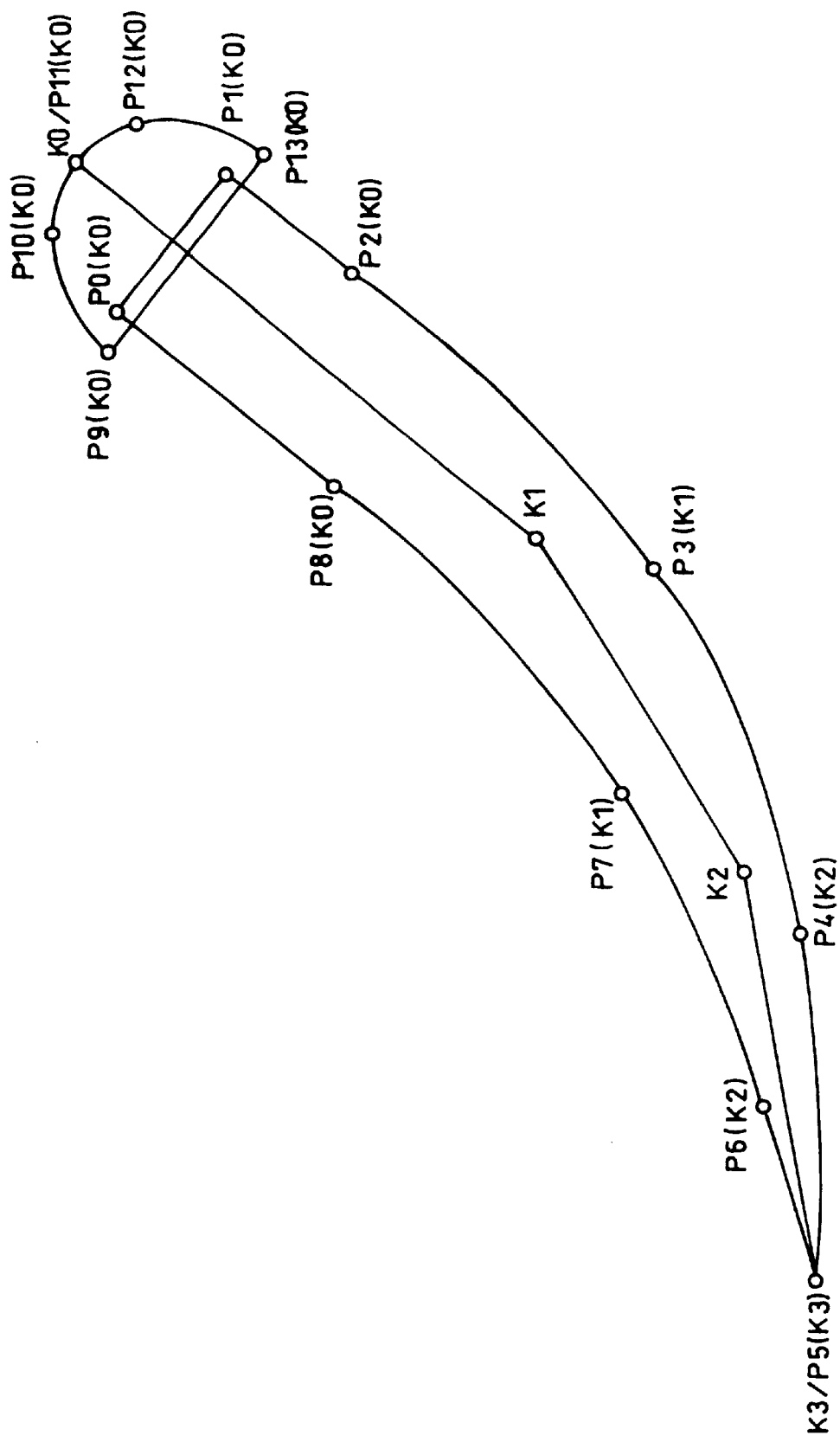
FIG. 11 is an explanatory view showing a correspondence between outline points and skeletal points of the element shape information.

Referring to FIGS. 5 to 7 and 11, the following description will explain the element shape changing information 423 of a single constituent element, i.e., a correspondence between the outline points and skeletal points relating to a single element. In FIG. 11, points K0, K1, K2 and K3 represent the skeletal points of a single element of the element shape information 42b. Next, points P0, P1, P2, P3, P4, P5, P6, P7, P8, P9, P10, P11, P12 and P13 represent the outline points of the single element of the element shape information 42b.

First, the lines connecting the skeletal points K0, K1, K2 and K3 are denoted as lines K0-K1, K1-K2, and K2-K3. Next, a line of minimum distance from each of the outline points P0, P1, P2, P3, P4, P5, P6, P7, P8, P9, P10, P11, P12 and P13 is found, and the skeletal point number of a skeletal point as the start point of the line is determined as a skeletal point number to which the outline points belong. Each skeletal point number thus obtained is stored as the element shape changing information 423 in the element shape information 42b.

Here, referring to the flow charts shown in FIGS. 12 to 15, the following description will explain an operation of the pattern generator 20 of the above-mentioned structure.

First, a character code of a single character to be generated, a typeface code, and a paint judging code are input through the input device 10 (step S1). Here, the character code, typeface code and paint judging code are read in an input buffer of the main memory 22 of the pattern generator 20.

Subsequently, the CPU 21 reads in the input buffer of the memory 22 the type skeletal shape information 42a of the single character corresponding to the character code specified by the processing-use data 42 in the auxiliary memory device 40, and the element shape information 42b corresponding to the typeface code (step S2).

Next, the CPU 21 judges a drawing order possessed by each constituent element of the type skeletal shape information 42a, and sorts the element paste information 202 so that the following processing is performed sequentially from the constituent element of the highest drawing order (step S3).

Next, the CPU 21 fetches the element code 204 of the single constituent element and the skeletal point coordinates data 210 of the constituent element from the type skeletal shape information 42a after sorting the element paste information 202, into the work area of the CPU 21 from the input buffer of the main memory 22 (step S4).

Next, the CPU 21 fetches the element information group 401 of the single constituent element corresponding to the element code 204 fetched in step S4, the outline point information group 402 and the skeletal point information group 403, into the work area of the CPU 21 from the input buffer of the main memory 22 (step S5).

Subsequently, in the element shape information changing section 23, the CPU 21 causes the coordinate values of the skeletal points of the skeletal point information group 403 as the element shape information 42b fetched in step S5 to coincide with the values of the skeletal point coordinates data 210 by means of, for example, scaling and rotation, according to the skeletal point coordinates data 210 of the constituent element of the type skeletal shape information 42a fetched in the work area of the CPU 21 in step S4. Then, with the movement of the lines K0-K1, K1-K2 and K2-K3 of the element shape information 42b, the outline points P0 to P13 of the element information group 401 as the element shape information 42 are moved (step S6).

Figure 16:
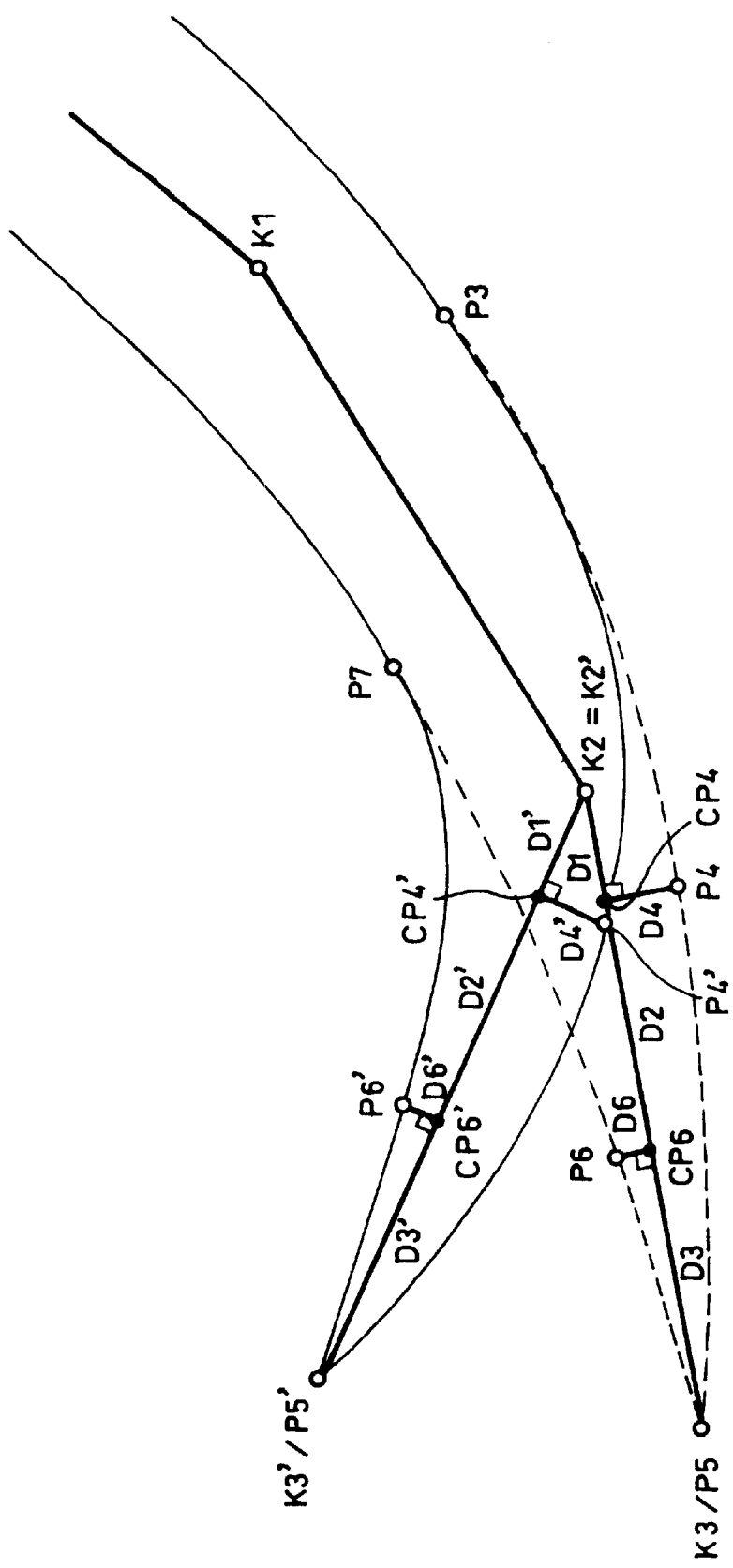
FIG. 16 is an explanatory view showing the movement of outline points when the element shape information is changed.

Referring now to FIG. 16, the following description will explain the movement of the outline points. Here, the movement of the line segment K2-K3 to the line segment K2'-K3' will be explained. Therefore, according to the element shape changing information 423, the outline points P4, P5 and P6 are subjected to the movement (because the skeletal point number to which the outline points P4 and P6 belong is K3). The conditions for the movement of the outline points P4 and P6 are as follows.

(1) Denote that the intersection points of the line segment K2-K3 and the vertical lines from the outline points P4 and P6 to the line segment K2-K3 are CP4 and CP6, the length of a line between the points K2 and CP4 is D1, a length of a line between the points CP4 and CP6 is D2, and a length of a line between the points CP6 and K3 is D3. Points CP4' and CP'6 are produced on the line segment K2'-K3' with the same ratio of lengths D1, D2 and D3 (the skeletal point K2' is located at the same position as the skeletal point K2). Here, denote that the length of line segment K2'-CP4' is D1', the length of line segment CP4'-CP6' is D2', and the length of line segment CP6'-K3' is D3'.

(2) Denoting that the distances from the line segment K2-K3 to the points P4 and P6 are D4 and D6, respectively, points P4' and P'6 representing the moved points P4 and P6 are positioned at locations separated from the points CP4' and CP6' given in (1) in a direction perpendicular to the lines K2'-K3' by the distances D4 and D6.

In other words, the conditions for the movement of the points P4 and P6 in FIG. 16 are (a) the length ratio is D1:D2:D3=D1':D2':D3', and (b) the distances are D4=D4' and D6=D6'. The conditions for the movement of the outline point P5 are also the same. However, in FIG. 16, since the outline point P5 has the same coordinate values as the skeletal point K3, the outline point P5' representing the moved outline point P5 is also moved to the same position as the skeletal point K3' representing the moved skeletal point K3. By moving the outline points to satisfy the conditions (a) and (b), it is possible to change the skeletal point coordinates and outline point coordinates of the element shape information 42b, according to the type skeletal shape information 42a.

Figure 12:
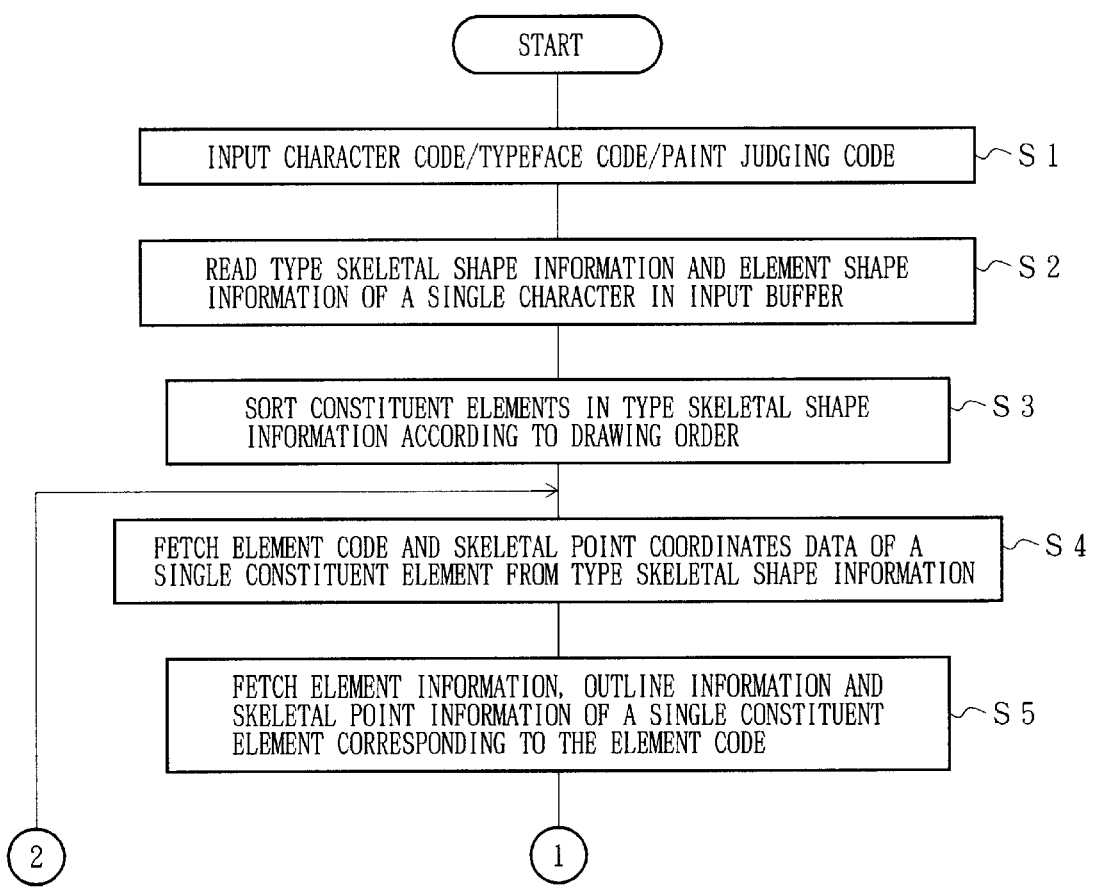
FIG. 12 is a first half part of a flow chart showing a flow of a pattern generating process in the information processing apparatus.
Figure 13:
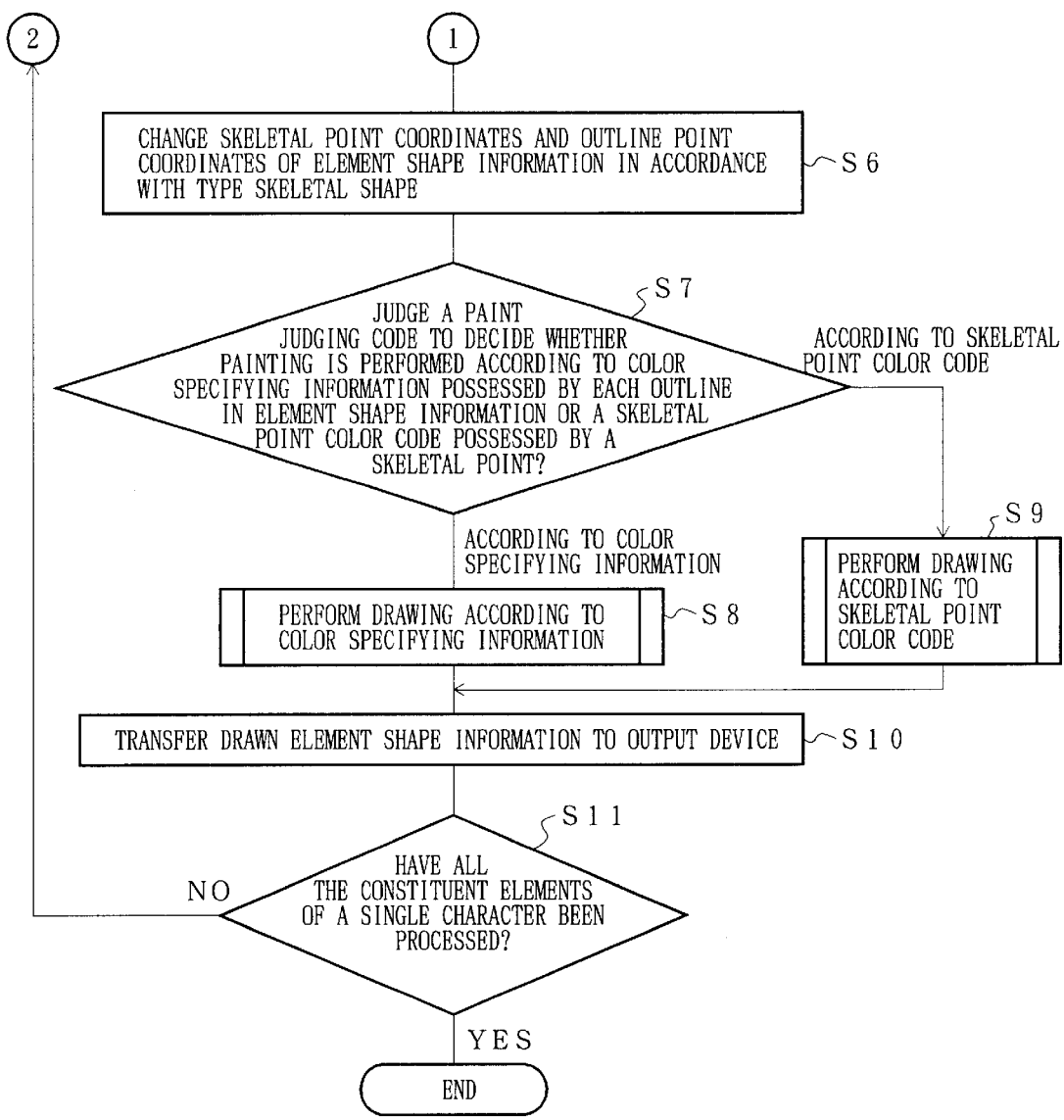
FIG. 13 is a second half part of the flow chart showing a flow of the pattern generating process in the information processing apparatus.

After changing the element shape information 42b in the above-mentioned manner, as shown in FIGS. 12 and 13, the CPU 21 distinguishes a paint judging code input in step S1, and judges whether painting is to be performed according to the color specifying information 413 of the element information 406 or the skeletal point color code 427 of the skeletal point information 425, in the painting way judging section 24 (step S7).

In step S7, if a painting way specified by the paint judging code accords with the color specifying information 413, the CPU 21 moves to step S8. On the other hand, if a painting way specified by the paint judging code accords with the skeletal point color code 427, the CPU 21 moves to step S9.

In step S8, in the drawing section 25 of the CPU 21, drawing is executed according to the color specifying information 413. The drawing according to the color specifying information 413 will be discussed in great detail later.

Meanwhile, in step S9, drawing according the skeletal point color code 427 is executed in the drawing section 25 of the CPU 21.

In step S8 or S9, when the drawing is completed, i.e., when the drawing of all the outlines belonging to a single piece of element information is completed, the CPU 21 transfers drawing signals in an output buffer of the main memory 22 to the output device 30 (step S10). In the output device 30, color display or color printing of a character/symbol/pictorial symbol pattern colored according to the drawing signals is performed.

Finally, the CPU 21 judges whether all the constituent elements of a single character have been processed (step S11). Here, if YES, all the drawing operations of the pattern generator 20 are completed. On the other hand, if the CPU 21 judges NO, the CPU 21 moves to step S4, and fetches the element code 204 of a single constituent element and the skeletal point coordinates data 208 of the constituent element from the type skeletal shape information 42a after sorting the element paste information 202, into the work area of the CPU 21 from the input buffer of the main memory 22.

Figure 14:
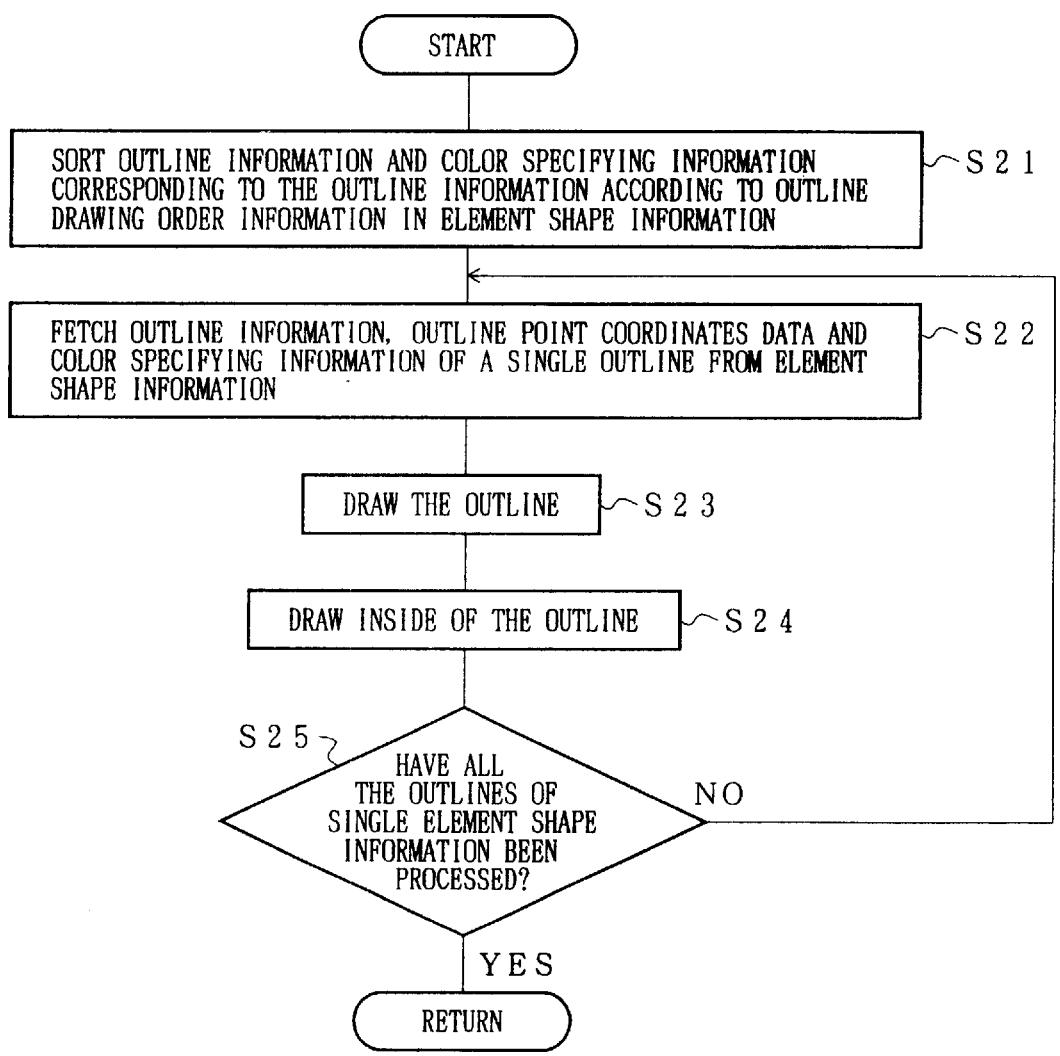
FIG. 14 is a flow chart showing a flow of a drawing process according to the color specifying information, in the pattern generating process.

Referring now to the flow chart shown in FIG. 14, the following description will explain the drawing performed according to the color specifying information 413 in step S8.

First, the CPU 21 distinguishes the outline drawing order information 414 of the element information 406, and sorts the outline information 409 so that processing is executed sequentially from the outline of the highest drawing order (step S21).

Next, the CPU 21 fetches the outline information 409 of a single piece of outline information 409 and the outline point coordinates data 422 from the element information 406 after sorting the outline information 409 (step S22).

In the drawing section 25 of the CPU 21, an outline is drawn according to the single piece of the outline information 409 and the outline point coordinates data 422 fetched in step S22 (step S23).

More specifically, in the drawing section 25, a grid optimum for the size of the outline point coordinates data 422 is set. For example, when the outline point coordinates data 422 representing a single outline point is composed of the X coordinate and Y coordinate, if each of the coordinates is within the range of from 0 to 10000, a rectangle with a point (0, 0) as an origin and a point (10000, 10000) as the diagonal point is set, and a grid composed of 10000×10000 pixels obtained by dividing the rectangle at every point in both the X and Y directions is set.

Next, in the drawing section 25, a pixel across which a curved line or a line segment obtained by connecting the outline points possessed by the outline point coordinates data 422 passes is recognized, and a drawing signal is generated based on the outline color information and the outline thickness 417 and outline color code 418 as plural pieces of inside color information of the color specifying information 413.

Figure 17:
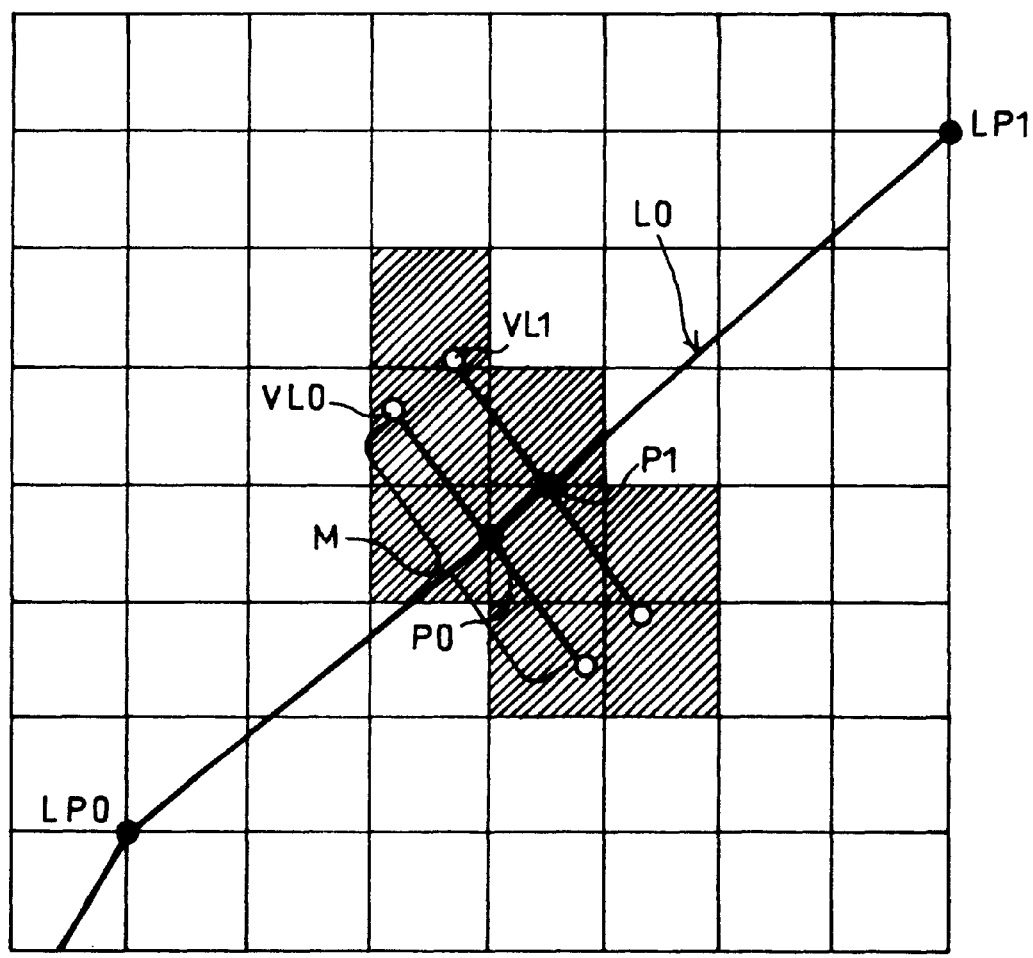
FIG. 17 is an explanatory view of outline drawing according to the color specifying information, in the pattern generating process of the information processing apparatus.

The drawing of outline will be explained with reference to FIG. 17. The conditions for the drawing are as follows. M is specified as the outline thickness 417. Black of the RGB system is specified as the outline color code 418. A line segment L0 is a part of an outline given by straight-line fitting of a curved line passing through a set of outline points LP0 and LP1. A point P0 is located on the line segment L0, and the X coordinate of the point P0 is on the grid.

First, a line segment VL0 which has a length M, passes through the point P0 and is perpendicular to the line segment L0 is obtained. Assume that the drawing signal of a pixel through which the line segment VL0 passes is (R, G, B)=(0, 0, 0).

Next, a vertical line segment VL1 of the length M which crosses the line segment L0 at a point P1 whose X coordinate is shifted from the point P0 by a length equal to a half of a side of a pixel in a direction from LP0 to LP1 is obtained. Assume that the drawing signal of a pixel through which the line segment VL1 passes is (R, G, B)=(0, 0, 0). The above-mentioned processing is performed on every point Pn through which a single outline passes, and the drawing signals are output to the output buffer of the main memory 22. In FIG. 17, a region drawn by the above-mentioned processing is indicated by hatching.

When the drawing of the outline is completed in the above-mentioned manner, the drawing section 25 of the CPU 21 draws the inside of the single outline (step S24) as indicated in FIG. 14.

Figure 18:
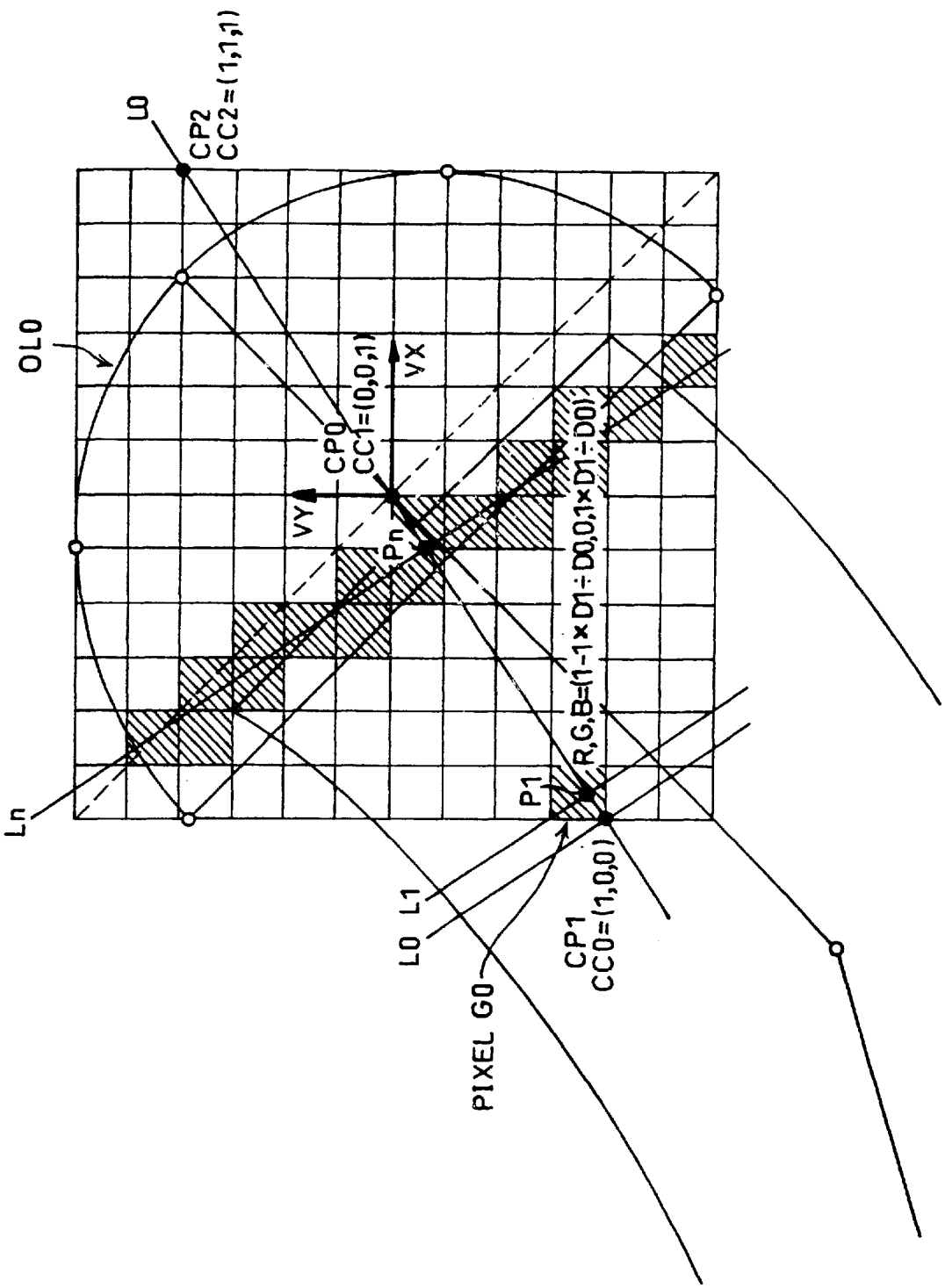
FIG. 18 is an explanatory view of inside drawing according to the color specifying information, in the pattern generating process of the information processing apparatus.

The drawing of the inside of the outline will be explained with reference to FIG. 18. Here, OL0 is an outline to be drawn, and the outline points are located on the grid composed of 10000×10000 pixels explained in step S23. Moreover, the drawing direction 419 is specified by vectors (VX, VY), and three kinds—CC0, CC1, CC2—of inside color codes 420 are stored. The color codes are specified so that CC0=(red of the RGB system), CC1=(blue of the RGB system), and CC2=(white of the RGB system).

First, an outer frame to which the outline to be drawn adjoins is set, and an intersection point CP0 of the diagonal lines of the outer frame is obtained. Then, intersection points CP1 and CP2 of the outer frame and a straight line DL0 which passes through the intersection point CP0 and has a gradient a=(VY/VX) are obtained.

Next, drawing reference points are set at the start point and end point of a line segment CP1-CP2, and a point obtained by dividing the line segment CP1-CP2 by a number given by (the number of kinds of the inside color codes 420−1). The processing order of the drawing reference points is set according to the arrangement thereof along the drawing direction 419. In the case of FIG. 18, the line segment CP1-CP2 is divided by two, and the drawing reference points have the same coordinates as CP1, CP0 and CP2. For the sake of convenience, CP0 to CP2 will be referred to as the drawing reference points.

Then, the drawing reference points and the pixels inside the outline are assigned drawing signals. Since the drawing reference points are processed sequentially according to the arrangement thereof along the drawing direction 419, first, the drawing reference points CP0 to CP2 are assigned the inside color codes 420 corresponding to each drawing reference point. In FIG. 18, CC0, CC1, CC2 are assigned as the inside color codes 420 to the drawing reference points CP1, CP0, and CP2, respectively. Since the color code CC0 of the drawing reference point CP1 is (red of the RGB system), the drawing signal of the CP1 is (1, 0, 0). Similarly, since the color code CC1 of CP0 is (blue of the RGB system), the drawing signal of the CP0 is (0, 0, 1). Besides, since the color code CC2 of CP2 is (white of the RGB system), the drawing signal of the CP2 is (1, 1, 1).

Subsequently, a drawing reference line segment CP1-CP0 connecting the drawing reference points is obtained, and a straight line L0 which passes through the drawing reference point CP1 and perpendicularly crosses the line segment CP1-CP0 is obtained. Then, a pixel which is in the inside of the outline OL0 and through which the straight line L0 passes is drawn by a drawing signal (1, 0, 0) having the same values as CP1.

Denoting a pixel having the intersection point CP1 on a side thereof as G0 and assuming that the side of the pixel G0 has a length=1 and the coordinates of a lower left point of the pixel G0 are (X0, Y0), the values of the drawing signal at a point P1 whose X coordinate is moved on the line segment CP1-CP0 in a direction from CP1 to CP0 by a half of the width of the pixel G0, i.e., to a point represented by an X coordinate=X0+½ are obtained.

Suppose that the length of the drawing reference line segment CP1-CP0 is D0, and the distance from the drawing reference point CP1 to the point P1 is D1. Since the drawing signals of the drawing reference point CP1 and the drawing reference point CP0 are (1, 0, 0) and (0, 0, 1), respectively, the drawing signal of the point P1 is (R, G, B)=(1−1×D1/D0, 0, 1×D1/D0).

Then, a straight line L1 which passes through the drawing reference point P1 and perpendicularly crosses the line segment CP1-CP0 is obtained, and a pixel which is in the inside of the outline OL0 and through which the straight line L1 passes is drawn by the drawing signal (1−1×D1/D0, 0, 1×D1/D0) which has the same values as the point P1.

Thereafter, by obtaining the drawing signal of a point Pn whose X coordinate is moved on the drawing reference line segments CP1-CP0 and CP0-CP2 by a length (a half of the length of a side) of a pixel and a straight line Ln, the drawing signals of all the pixels inside the outline OL0 are obtained and output to the output buffer of the main memory 22. Note that a region drawn by the above-mentioned processing is shown by hatching in FIG. 18.

After performing drawing according to the color specifying information 413 in the above-mentioned manner, as illustrated in FIG. 14, the CPU 21 judges whether the above-mentioned drawing process has been performed on every outline possessed by the single element information 406 (step S25). Here, when the processing of all the outlines has not been completed, the CPU 22 returns to step S22 and extracts the next outline information 409 and outline point coordinates data 422.

On the other hand, in step S25, if the processing of all of the outlines has been completed, the CPU 21 moves to step S10 of the flow chart shown in FIG. 13.

Figure 15:
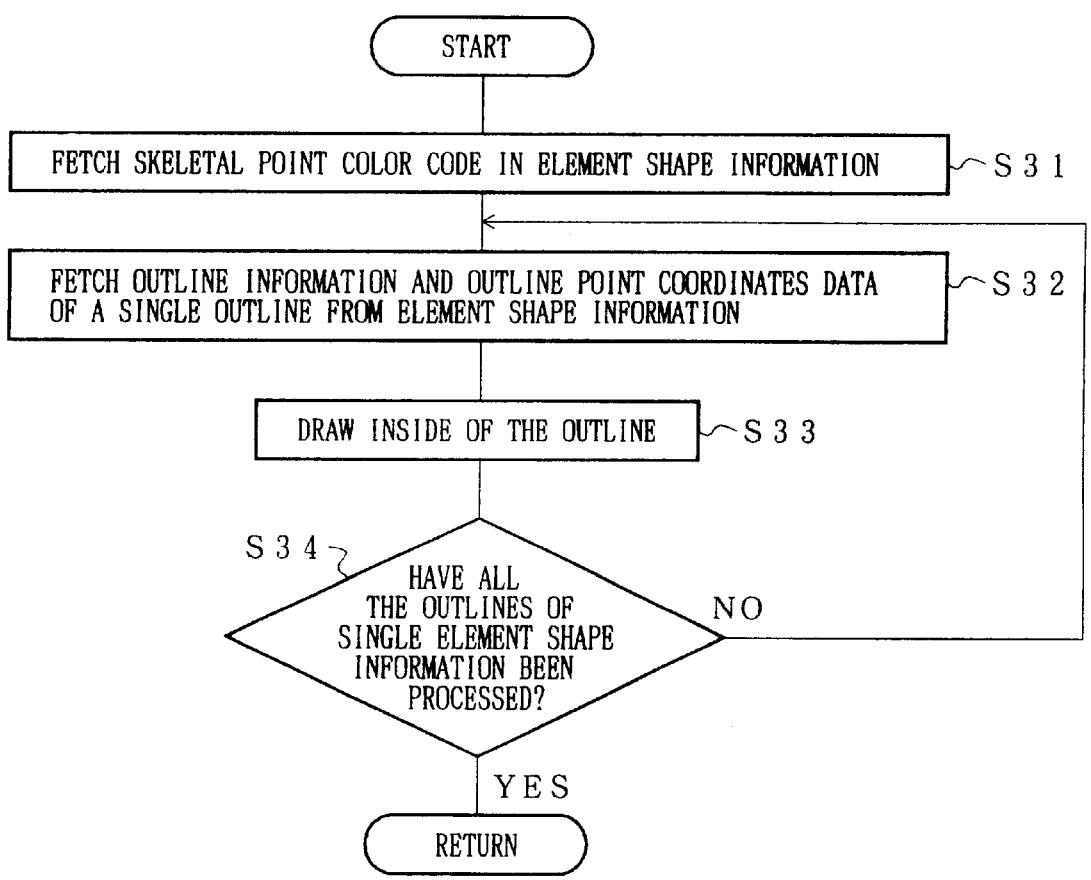
FIG. 15 is a flow chart showing a flow of a drawing process according to the skeletal point color codes, in the pattern generating process.

Next, referring to the flow chart of FIG. 15, the following description will explain the drawing process according to the skeletal point color code in step 9 shown in FIG. 13.

First, the CPU 21 extracts the skeletal point color code 427 in the element shape information 42*b* (step S31). More specifically, the CPU 21 fetches the skeletal point information 425 into the work area according to the number of skeletal points 415 and the pointer 416 to the skeletal point coordinates data in the element information 42*b*.

Subsequently, the CPU 21 extracts the outline point coordinates data 422 from the element shape information 42*b*, according to a single piece of the outline information 409 (step S32).

The CPU 21 draws the inside of the outline (step S33). Specifically, in the drawing section 25 of the CPU 21, the inside of the outline is drawn according to the skeletal point color codes 427 possessed by the skeletal points and the outline point coordinates data 422.

Figure 19:
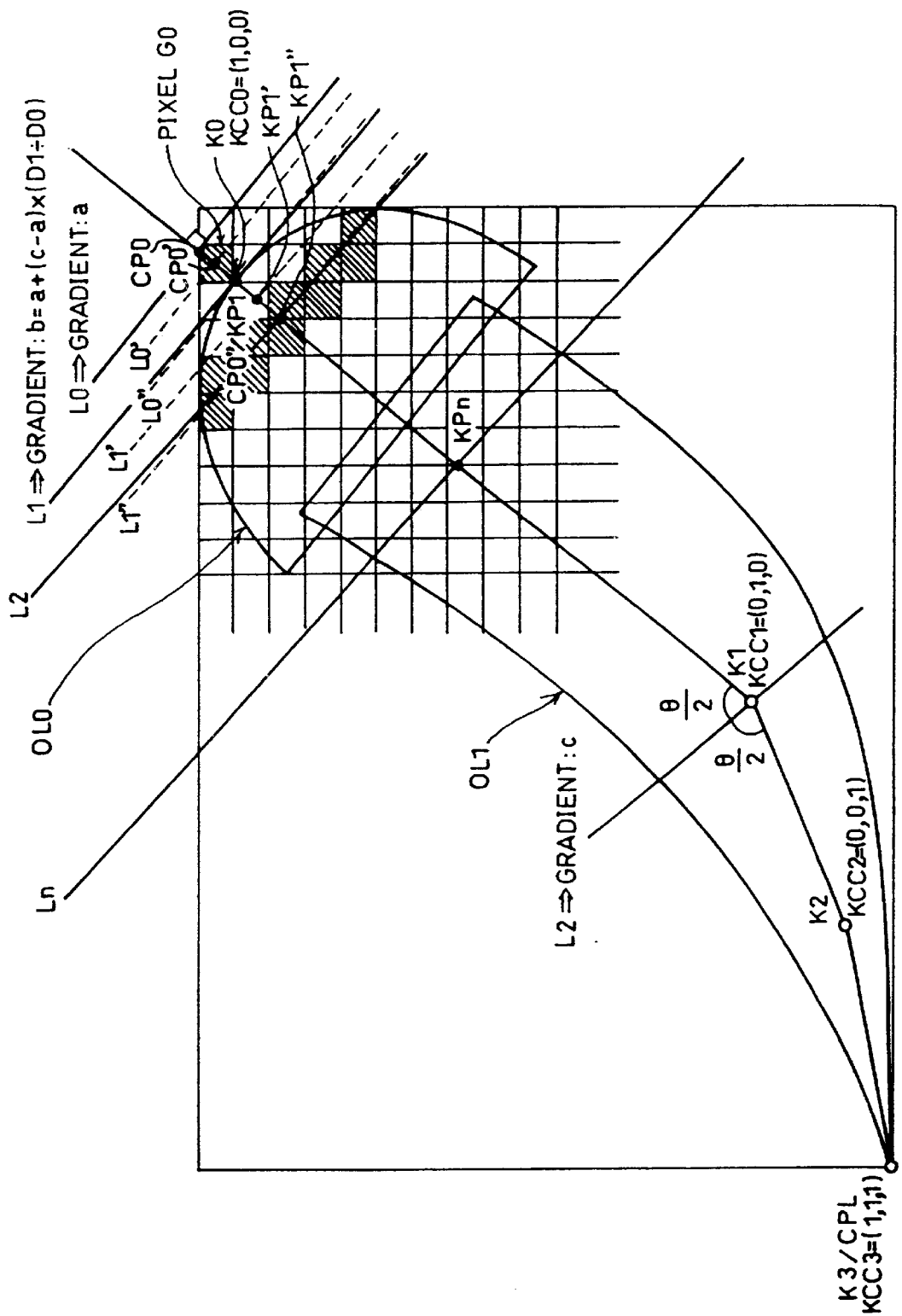
FIG. 19 is an explanatory view of inside drawing according to the skeletal point color codes, in the pattern generating process of the information processing apparatus.

Next, the drawing of the inside of the outline will be explained with reference to FIG. 19. Suppose that the skeletal point color code KCC0 possessed by the skeletal point K0 is (red of the RGB system), the skeletal point color code KCC1 possessed by the skeletal point K1 is (green of the RGB system), the skeletal point color code KCC2 possessed by the skeletal point K2 is (blue of the RGB system), and the skeletal point color code KCC3 possessed by the skeletal point K3 is (white of the RGB system).

The outlines OL0 and OL1 indicate the entire outlines possessed by a single element, and the outline points are located on the grid composed of 10000×10000 pixels as explained in step S23 of the flow chart of FIG. 14. First, an outer frame to which the outlines OL0 and OL1 to be drawn adjoin is set. Then, an intersection point of the outer frame and a straight line connecting skeletal points K1 and K0 is denoted as CP0, and an intersection point of the outer frame and a straight line connecting skeletal points K2 and K3 is denoted as CPL.

Next, the values of the drawing signals of the inside of the outlines are obtained. As the drawing signals of the point CP0 on a line segment CP0-K1, the drawing signal=(1, 0, 0) of K0 is used. As the drawing signals of the point CP1 on a line segment K2-CP1, the drawing signal=(0, 0, 0) of K3 is used. The drawing-use straight line L0 which passes through the intersection point CP0 and perpendicularly crosses the line segment CP0-K1 is obtained. Then, a pixel which is the inside of the outline OL0 or OL1 and through which the drawing-use straight line L0 passes is drawn by the drawing signal (1, 0, 0) having the same values as CP0.

Denoting a pixel having an intersection point CP0 on a side thereof as G0 and assuming that the side of the pixel G0 has a length=1 and that the coordinates of a lower left point of the pixel G0 are (X0, Y0), a drawing-use straight line L0' which passes through a point CP0' whose X coordinate is moved on the line segment CP0-K1 in a direction from CP0 to K1 by a half of the width of the pixel G0, i.e., to a point represented by an X coordinate=X0+½, and has the same gradient as the drawing-use straight line L0 is obtained, and a pixel through which the drawing-use straight line L0' passes is drawn by the drawing signal (1, 0, 0).

Similarly, a drawing-use straight line L0" which passes through a point CP0" whose X coordinate is further shifted from the point CP0' by a half of the length of a side of the pixel and has the same gradient as the drawing-use straight line L0 is obtained, and a pixel through which the drawing-use straight line L0" passes is drawn by the drawing signal (1, 0, 0).

Next, a new drawing-use straight line L1 (gradient b) which passes through the point CP0" is obtained. For the sake of convenience, the point CP0" will be hereinafter referred to as the point KP1. Suppose that the gradient of the drawing-use straight line L0 is a. At the skeletal point K1, the angle formed by the line segment CP0-K1 and the line segment K1-K2 is denoted as θ. The bisector of the angle θ is denoted as L2, and the gradient of the straight line L2 is denoted as c. Moreover, the length of the line segment CP0-K1 is denoted as D0, and the distance from CP0 to the point KP1 is denoted as D1. At this time, the gradient b of the new drawing-use straight line L1 at the point KP0 is given by the following equation (1).

$$b = a + (c-a) \times (D1/D0) \quad (1)$$

After calculating the gradient b from the above equation (1), the values of the drawing signal at the point KP1 are obtained. Since the drawing signal=(1, 0, 0) at CP1 and the drawing signal=(0, 1, 0) at K1, the drawing signal at the point KP1 is (R, G, B)=(1−1×D1/D0, 1×D1/D0, 0). Then, a pixel which is the inside of the outline OL0 or OL1 and through which the drawing-use straight line L1 passes is drawn by the drawing signal (1−1×D1/D0, 1×D1/D0, 0).

Thereafter, the same drawing process is repeated. Specifically, a drawing-use straight line L1' which passes through a point KP1' whose X coordinate is shifted on the line segment CP0-K1 in a direction from CP01 to K1 by a length equal to a half of a side of the pixel, and has a gradient of the same value as the drawing-use straight line L1 is obtained. Then, a pixel through which the drawing-use straight line L1' passes is drawn by the drawing signal (1−1×D1/D0, 1×D1/D0, 0).

Furthermore, a drawing-use straight line L1" which passes through a point KP1" whose X coordinate is further shifted by a length equal to a half of a side of the pixel and has a gradient of the same value as the drawing-use straight line L1 is obtained. Then, a pixel through which the drawing-use straight line L1" passes is drawn by the drawing signal (1−1×D1/D0, 1×D1/D0, 0). Subsequently, a new drawing-use straight line L2 passing through the point KP1" is obtained.

While obtaining the drawing signal values of a point KPn on the line segment K1-K2 and line segment K2-CPL and a drawing-use straight line Ln passing through the point KPn, the inside of the outline is drawn, and the drawing signal of the pixel is output to the output buffer of the main memory 22. However, a drawing-use straight line which passes through the end point CPL on the line segment K2-CPL crosses the line segment CP0-K1 at a right angle like the start point CP0 on the line segment CP0-K1. Note that the hatched portion in FIG. 19 represents a region drawn by the above-mentioned processing.

After performing drawing according to a skeletal point color code as described above, the CPU 21 judges whether all of the outlines corresponding to a single piece of the element shape information has been processed as shown in FIG. 15 (step S34).

Here, if CPU 21 judges that the processing of all of the outlines has not been completed, it returns to step 32 and extracts the next outline information 409 and outline point coordinates data 422.

On the other hand, in step S34, if the CPU 21 judges that the drawing of all of the outlines corresponding to the single piece of the element information 406 has been completed, it moves to step S10 shown in the flow chart of FIG. 13 so as to transfer the drawing signal in the output buffer of the main memory 22 to the output device 30.

Figure 20:
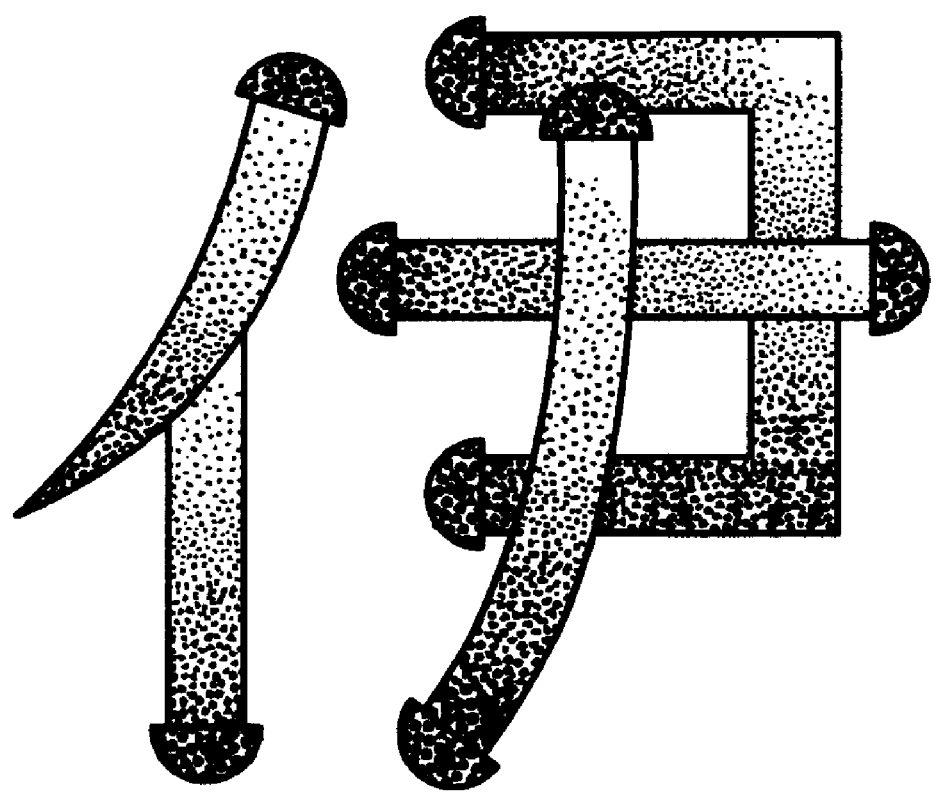
FIG. 20 is an explanatory view showing an example of pattern generation by drawing according to the color specifying information in the information processing apparatus.
Figure 21:
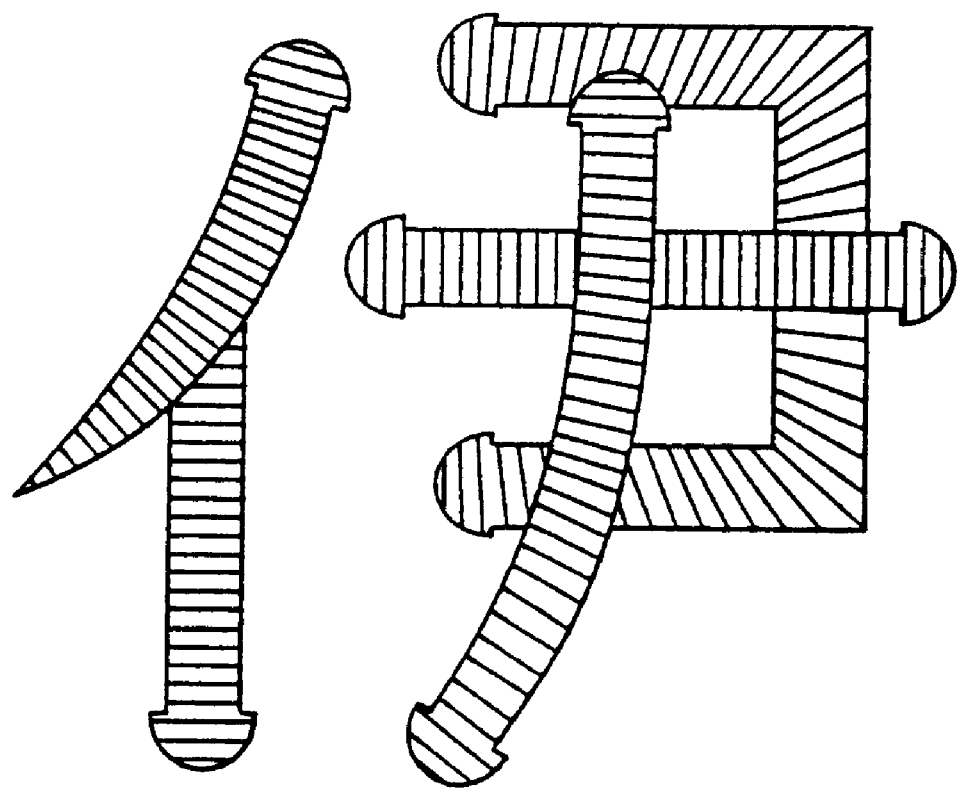
FIG. 21 is an explanatory view showing an example of pattern generation by drawing according to the skeletal point color codes in the information processing apparatus.

Therefore, in the above-mentioned outline drawing process, for example, a character represented by character code No. 1643 is output to the display means and printing means as shown in FIGS. 20 and 21. The character shown in FIG. 20 represents an example of a character drawn according to the color specifying information 413, and the gradation of each element is individually set. Moreover, the character shown in FIG. 21 is an example of a character drawn according to the skeletal point color codes, and has changes in color along the curved lines of strokes (constituent elements).

According to the above-mentioned first embodiment, when drawing a constituent element, the drawing information such as the drawing order information and color specifying information 413 are stored so as to be contained in the respective type skeletal shape information 42a and element shape information 42b. However, the present invention is not necessarily limited to such a structure. In other words, only the drawing information can be stored independently of the type skeletal shape information 42a and the element shape information 42b. This example will be explained in the following second embodiment.

[Second Embodiment]

The following description will explain another embodiment of the present invention with reference to FIGS. 22 to 29. For the sake of convenience of explanation, the members having the same functions as those in the above-mentioned first embodiment will be designated by the same codes and the explanation thereof will be omitted.

Like the above-mentioned first embodiment, an information processing apparatus of this embodiment includes the input device 10, pattern generator 20, output device 30, and auxiliary memory device 40.

Figure 23:
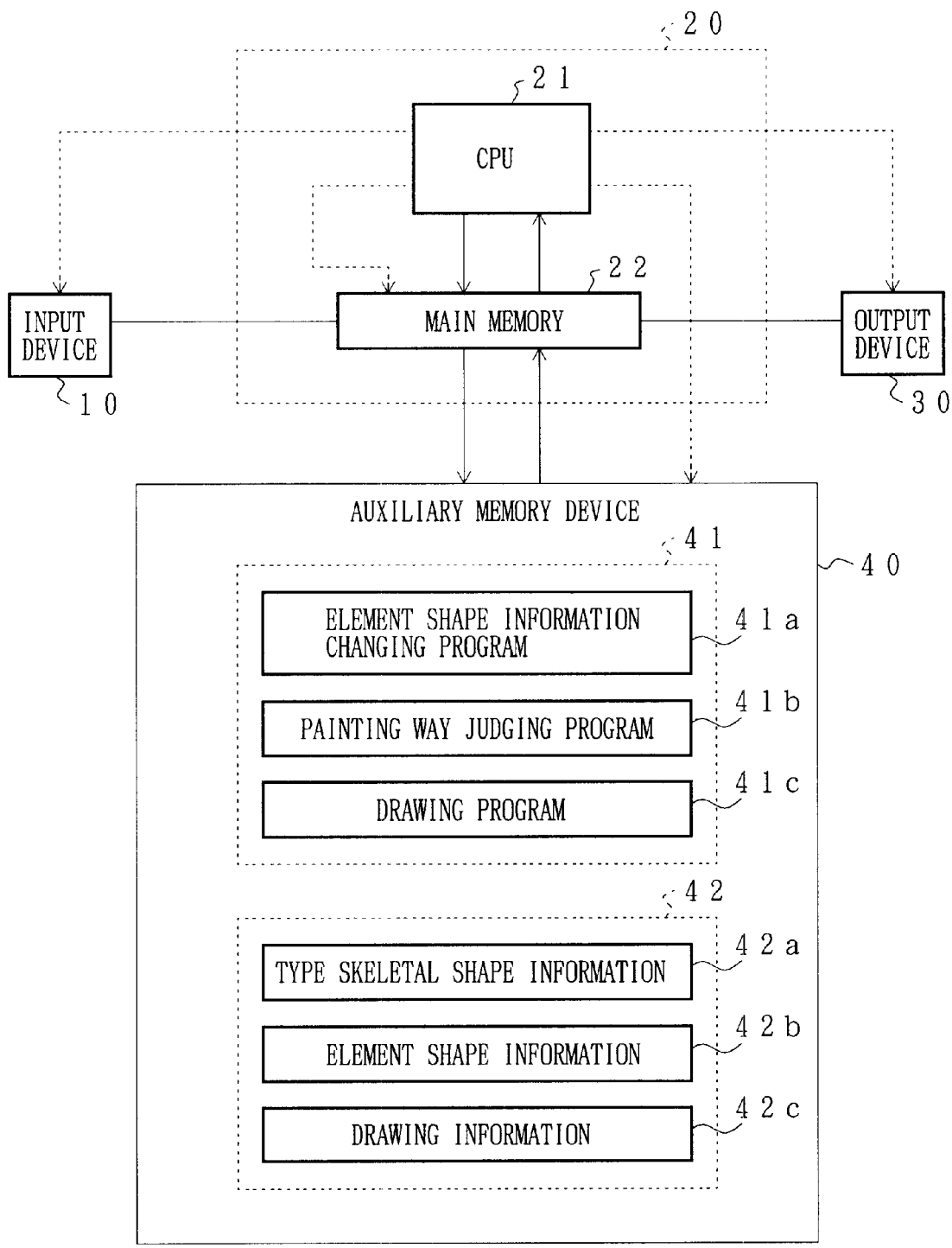
FIG. 23 is a schematic block diagram showing another example of an information processing apparatus of the present invention.

Here, only the difference between this embodiment and the above-mentioned first embodiment is that drawing information 42c as the information for drawing a constituent element by determining the color and pattern of the constituent element is newly contained in the processing-use data 42 in the auxiliary memory device 40 as shown in FIG. 23. The content of the drawing information 42c will be described in great detail later.

Figure 22:
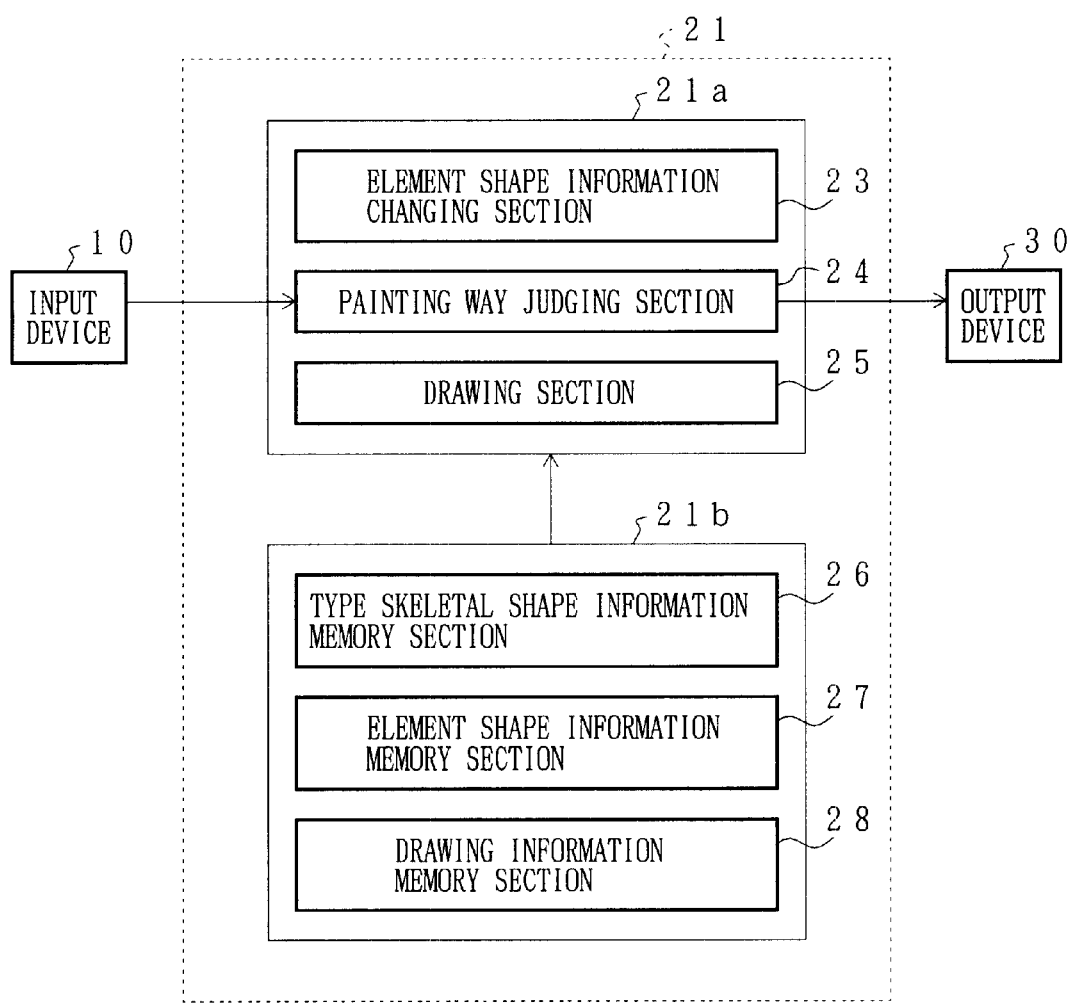
FIG. 22 is an explanatory view showing another example of executing a processing program by the CPU in the pattern generator of the information processing apparatus of the present invention.

Thus, in FIG. 22, a drawing information memory section 28 is newly provided in the data storage section 21b, in addition to the type skeletal shape information memory section 26 and element shape information memory section 27.

By storing the drawing information 42c independently as described above, the drawing information contained in the type skeletal shape information 42a and element shape information 42b in the first embodiment is changed to pointer information to the drawing information 42c.

Figure 24:
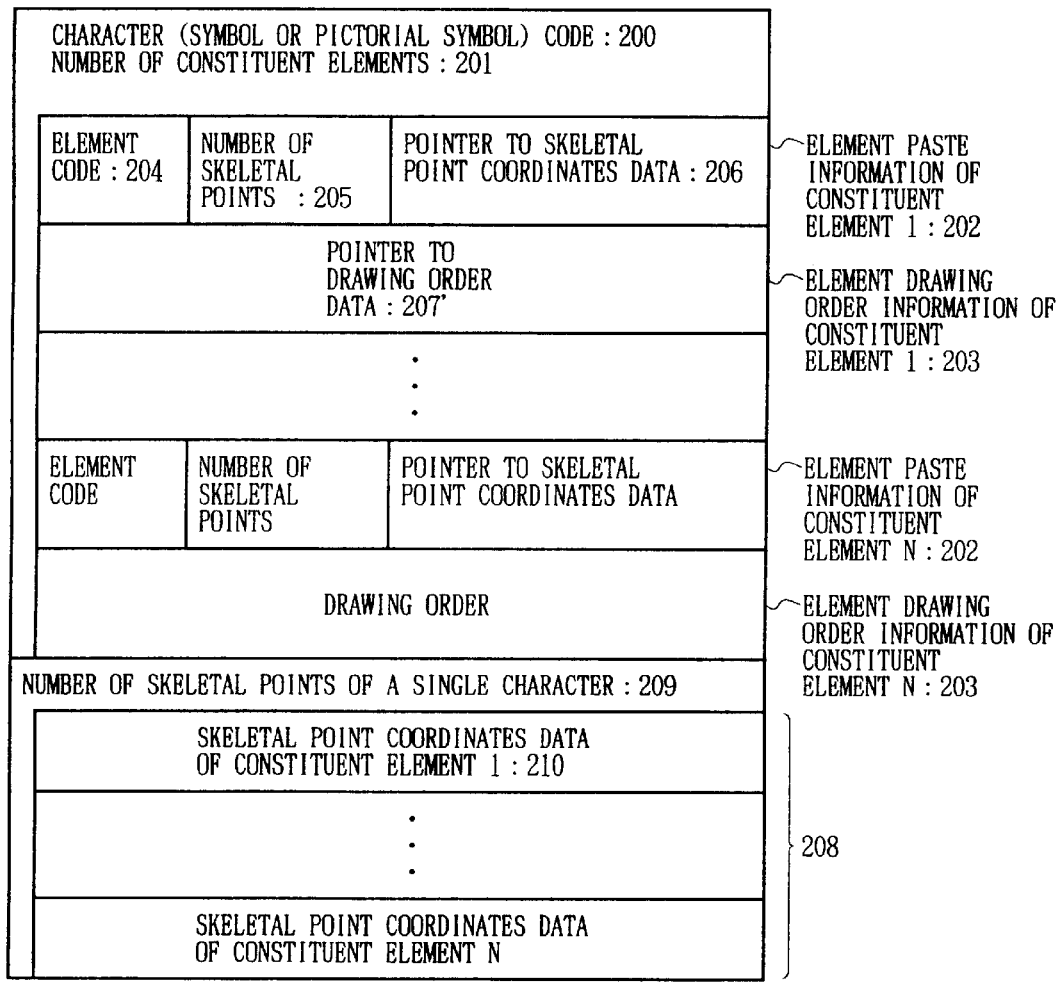
FIG. 24 is an explanatory view showing an example of information contained in type skeletal shape information stored in an auxiliary memory device incorporated into the information processing apparatus of FIG. 23.

More specifically, as illustrated in FIG. 24, in the type skeletal shape information 42a, a pointer 207' to the drawing order data for specifying the drawing order information is stored for each element code 204, instead of the drawing order 207 of a constituent element as the drawing information shown in FIG. 3.

Moreover, in the element shape information 42b, as illustrated in FIGS. 25 to 27, among the element information 406 shown in FIG. 5, a pointer 413' to color specifying information is stored instead of the color specifying information 413, and a pointer 414' to outline drawing order data is stored instead of the outline drawing order information 414. Furthermore, among the skeletal point information 425, a pointer 427' to a skeletal point color code is stored instead of the skeletal point color code 427.

The information specified by the pointers related to the drawing information stored in the above-mentioned type skeletal shape information 42a and element shape information 42b is the drawing information 42c shown in FIGS. 28 and 29. Namely, the drawing information 42c is information necessary for drawing a constituent element, information indicating a drawing order assigned to each constituent element of each character as shown in FIG. 28, and the color specifying information, outline drawing information and the information indicating a skeletal point code assigned to each constituent element according to each typeface as shown in FIG. 29.

As described above, unlike the first embodiment, by storing the drawing information 42c for drawing a constituent element independently of the type skeletal shape information 42a and element shape information 42b, instead of including the drawing information 42c in the type skeletal shape information 42a and element shape information 42b, it is possible to store the respective information on different recording media.

With this arrangement, it is possible to easily change only the drawing information 42c for drawing a constituent element, without changing the contents of the type skeletal shape information 42a and element shape information 42b. Consequently, since the user can change the design of a desired typeface and pattern such as coloring individually, the drawing information 42c can be set by each user. Moreover, when a new typeface is developed, the present invention can manage the new typeface quickly.

As described above, in the first and second embodiments, programs and data for use in the pattern generator 20 incorporated into an information processing apparatus of the present invention are stored on a recording medium which is attachable to and detachable from the auxiliary memory device 40. Thus, if a recording medium which is attachable to and detachable from the auxiliary memory device 40 incorporated in the information processing apparatus as a main device is used as memory means for storing the above-mentioned programs and data, it is possible to easily create the same environment in another information processing apparatus.

More specifically, the information stored in the auxiliary memory device 40 shown in FIGS. 2 or 23 may be stored on recording media such as CD-ROM and MO, and these recording media may be used in an information processing apparatus incorporating a device for reproducing information from these media, such as a CD-ROM device and MO device.

Incidentally, for the above-mentioned recording media, it is possible to use media which carry programs and data permanently, including tapes such as magnetic tapes and cassette tapes; disks such as magnetic disks including floppy disks and hard disks, and optical disks including MD and DVD; cards such as IC cards (including memory cards) and optical cards; and semiconductor memory such as mask ROM, EPROM and flash ROM, as well as the above-mentioned CD-ROM and MO.

Moreover, in a system which can be connected to communication networks including the internet, a medium which carries programs and data flexibly so that the programs and data are downloaded from the communication networks may be used. When downloading the programs and data from the communication systems, a download-use program may be stored in the system in advance or installed from another recording medium.

Thus, by storing the programs and data necessary for the pattern generator 20 on portable recording media, the programs and data can be easily changed. For instance, when a new typeface as data is developed, the present invention can manage the new typeface quickly.

Hence, with the present invention, as described in the first and second embodiments, a character of a desired pattern is displayed according to the type skeletal shape information 42a and element shape information 42b stored in advance. Consequently, it is possible to hold the type skeletal shape information 42a indicating the skeletal shape of the character and the element shape information 42b indicating an outline shape and skeletal shape of a minimum element constituting the character sorted according to typeface, and generate the outline of a desired pattern by deforming the element shape according to the type skeletal shape.

Namely, compared with conventional development of a font which requires designing the patterns of all of characters (including symbols and pictorial symbols) of each of different typefaces and adding color information with respect to every stroke, it is possible to develop a typeface with a reduced number of steps and decrease the data volume, because a pattern can be generated by simply designing the element shape information 42b sorted according to typeface and setting the color information.

Moreover, as described above, since the element drawing order information indicating the precedence of drawing is included in the type skeletal shape information 42a, it is possible to easily control over-painting of the constituent elements, and generate a high-quality pattern without a limitation to the design of pattern.

Furthermore, as described above, since a single piece of element information 406 includes plural pieces of outline information 409, color specifying information 413 corresponding to each piece of outline information 409 and outline drawing order information 414 indicating the precedence in drawing, it is possible to express a complicated outline shape and coloration, and easily control the over-painting of the outlines. Consequently, a high-quality pattern can be generated without a limitation to the design of pattern.

Besides, since the color specifying information 413 of each outline information 409 has outline color information and plural pieces of inside color information, it is possible to draw a patten in which a single outline is colored geometrically, for example, colored to have gradations shown in FIG. 20. Thus, a pattern with high-quality color representation can be generated.

In addition, since a single piece of element information 406 has the unique skeletal point color code 427 for each skeletal point of the skeletal information 410, it is possible to generate a pattern in which the inside of the element is geometrically colored, for example, a pattern colored to have gradations shown in FIG. 21. Moreover, the skeletal point color code 427 has a value which is independent of the color specifying information 413 included in the outline information 409, and a plurality of painting methods can be hold for each piece of element information 406 of each typeface. It is therefore possible to generate patterns colored in various ways, without increasing the data volume.

Furthermore, with the present invention, it is possible to over-painting of the respective pieces of element information 406 and over-painting of a plurality of outlines corresponding to a single piece of element information 406. Thus, a high-quality pattern can be generated without a limitation to the design of pattern.

Besides, it is possible to perform both drawing according to the color specifying information 413 possessed by the outline information 409 and drawing according to the skeletal point color code 427 possessed by a skeletal point. Hence, patterns colored in various ways can be generated, without increasing the data volume.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

For instance, the present invention is effective not only for Chinese kanji characters, but also for patterns of alphanumeric characters including alphabets, symbols and pictorial symbols.

What is claimed is:

1. An information processing apparatus for generating patterns of characters, including symbols and pictorial symbols, comprising:

information memory means for storing, in advance, 1) type skeletal shape information indicating a skeletal shape of each of the characters and 2) element shape information indicating an outline shape and a skeletal shape of each of constituent elements constituting each of the characters;

element shape information changing means for changing the element shape information according to the type skeletal shape information; and pattern generating means for generating a pattern of the characters by drawing the constituent elements of the characters according to the changed element shape information and by combining the constituent elements drawn.

2. An information processing apparatus for generating patterns of characters, including symbols and pictorial symbols, 1) by changing element shape information indicating an outline shape and a skeletal shape of each of the constituent elements constituting each of the characters, according to type skeletal shape information indicating a skeletal shape of each of the characters, 2) by drawing the constituent elements according to the changed element shape information, and 3) by combining the constituent elements drawn.

3. A recording medium with a pattern generation program recorded thereon, for use in an information processing apparatus for generating patterns of characters including symbols and pictorial symbols, said pattern generation program comprising a process of generating a pattern, 1) by changing element shape information indicating an outline shape and a skeletal shape of each of the constituent elements constituting each of the characters, according to type skeletal shape information indicating a skeletal shape of each of the characters, 2) by drawing the constituent elements according to the changed element shape information, and 3) by combining the constituent elements drawn.

4. The information processing apparatus as set forth in claim 1, wherein at least element paste information which specifies the element shape information corresponding to the constituent elements, and element drawing order information which specifies order of precedence of drawing performed by said pattern generating means are stored as the type skeletal shape information in said information memory means.

5. The information processing apparatus as set forth in claim 1, wherein at least a single piece or plural pieces of outline information, color specifying information corresponding to each piece of the outline information, outline drawing order information which specifies order of precedence of outline drawing performed by said pattern generating means, and skeletal point information indicating a skeletal shape peculiar to each constituent element are stored as the element shape information in said information memory means.

6. The information processing apparatus as set forth in claim 5, wherein the color specifying information includes outline color information which specifies a color code and a thickness of an outline of each constituent element, and inside color information composed of a direction of drawing an inside of the constituent element and a single color code or a plurality of color codes.

7. The information processing apparatus as set forth in claim 5, wherein the element shape information includes coordinates values representing each of skeletal points for expressing the skeletal shape, and a skeletal point color code indicating color information peculiar to each skeletal point.

8. The information processing apparatus as set forth in claim 2, wherein the drawing of each constituent element is performed according further to drawing information for determining a design, including color and pattern, of the constituent element.

9. The information processing apparatus as set forth in claim 1, wherein drawing information for determining a design, including color and pattern, of each constituent element is stored in said information memory means in advance, and said pattern generating means draws the constituent elements according further to the drawing information.

10. The information processing apparatus as set forth in claim 9, wherein the drawing information is composed of drawing order information indicating a drawing order of each constituent element, color specifying information specifying a color of each constituent element, outline drawing order information indicating a drawing order of an outline of each constituent element, and skeletal point color information specifying a color of a skeletal point of each constituent element.

11. The recording medium with the pattern generation program recorded thereon as set forth in claim 3, wherein, in said process, the constituent elements of each character are drawn by changing the outline shape and skeletal shape of each of the constituent elements according to the skeletal shape of the character.

12. The recording medium with the pattern generation program recorded thereon as set forth in claim 3, wherein said process comprises a step of drawing an outline according to the outline shape and drawing a region enclosed by each outline to draw an inside of the outline.

13. The recording medium with the pattern generation program recorded thereon as set forth in claim 3, wherein said process comprises a step of drawing an outline according to the outline shape and drawing an inside of the outline according to the skeletal shape.

14. The recording medium with the pattern generation program recorded thereon as set forth in claim 3, wherein, in said process, each constituent element is drawn according further to drawing information for determining a design, including color and pattern, of the constituent element.

15. The recording medium with the pattern generation program recorded thereon as set forth in claim 14, wherein, in said process, each constituent element is drawn by changing the outline shape and the skeletal shape of the constituent element, according to the skeletal shape of the character.

16. The information processing apparatus in claim 2, wherein the type skeletal shape information includes at least:

element paste information which specifies the element shape information corresponding to the constituent elements; and element drawing order information which specifies order of precedence of drawing performed by the pattern generating means.

17. The recording medium as set forth in claim 3, wherein the type skeletal shape information includes at least:

element paste information which specifies the element shape information corresponding to the constituent elements; and element drawing order information which specifies order of precedence of drawing performed by the pattern generating means.

18. The information processing apparatus as set forth in claim 2, wherein the element shape information includes at least:

a single piece or plural pieces of outline information;

color specifying information corresponding to each piece of the outline information;

outline drawing order information which specifies order of precedence of outline drawing performed by the pattern generating means; and skeletal point information indicating a skeletal shape peculiar to each constituent element.

19. The recording medium as set forth in claim 3, wherein the element shape information includes at least:

a single piece or plural pieces of outline information;

color specifying information corresponding to each piece of the outline information;

outline drawing order information which specifies order of precedence of outline drawing performed by the pattern generating means; and skeletal point information indicating a skeletal shape peculiar to each constituent element.

* * * * *